United States Patent
Mei et al.

(10) Patent No.: US 9,626,762 B2
(45) Date of Patent: Apr. 18, 2017

(54) STOCHASTIC RASTERIZATION USING ENHANCED STENCIL OPERATIONS ON A GRAPHICS PROCESSING UNIT (GPU)

(71) Applicant: QUALCOMM Incorporated, San Diego, CA (US)

(72) Inventors: Chunhui Mei, San Diego, CA (US); Tao Wang, Sunnyvale, CA (US); Young In Yeo, Orlando, FL (US); Vineet Goel, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 78 days.

(21) Appl. No.: 14/686,696

(22) Filed: Apr. 14, 2015

(65) Prior Publication Data
US 2015/0294498 A1  Oct. 15, 2015

Related U.S. Application Data

(60) Provisional application No. 61/979,931, filed on Apr. 15, 2014.

(51) Int. Cl.
| | | |
|---|---|---|
| G06T 15/80 | (2011.01) | |
| G06T 7/00 | (2017.01) | |
| G06T 1/20 | (2006.01) | |
| G06T 1/60 | (2006.01) | |
| G06T 13/80 | (2011.01) | |
| G06T 15/00 | (2011.01) | |
| G06T 7/70 | (2017.01) | |

(52) U.S. Cl.
CPC .............. *G06T 7/004* (2013.01); *G06T 1/20* (2013.01); *G06T 1/60* (2013.01); *G06T 7/70* (2017.01); *G06T 13/80* (2013.01); *G06T 15/005* (2013.01); *G06T 15/80* (2013.01); *G06T 2210/12* (2013.01)

(58) Field of Classification Search
CPC .. G06T 7/004; G06T 1/20; G06T 1/60; G06T 13/80; G06T 15/005; G06T 2210/12
See application file for complete search history.

(56) References Cited

U.S. PATENT DOCUMENTS

| | | | |
|---|---|---|---|
| 6,211,882 B1 * | 4/2001 | Pearce | G06T 13/80 345/419 |
| 2014/0184597 A1 * | 7/2014 | Clarberg | G06T 15/005 345/423 |

OTHER PUBLICATIONS

Wloka, M.M. & Zeleznik, R.C., "Real-time Motion Blur", The Visual Computer (1996), p. 283-295.*
Fatahalian, et al., "Data-Parallel Rasterization of Micropolygons with Defocus and Motion Blur", Proceedings of the 1st ACM Conference on High Performance Graphics, HPG '09, Aug. 1-3, 2009, XP055198355, pp. 59-68.
Huang, et., al., "Scalable Programmable Motion Effects on GPUs", Computer Graphics Forum, vol. 31, No. 7, Sep. 2012, XP055199012, pp. 2259-2266, ISSN: 0167-7055.

(Continued)

*Primary Examiner* — Jacinta M Crawford
*Assistant Examiner* — Diane Wills
(74) *Attorney, Agent, or Firm* — Shumaker & Sieffert, P.A.

(57) ABSTRACT

Techniques are described for stochastic rasterization. A graphics processing unit (GPU) may discard samples of bounding polygons that together indicate movement of one or more primitives before a pixel shader process the samples. The GPU may leverage a stencil buffer and stencil test for discarding of such samples.

22 Claims, 9 Drawing Sheets

(56) References Cited

OTHER PUBLICATIONS

International Search Report and Written Opinion from International Application No. PCT/US2015/025896, dated Jul. 13, 2015, 12 pp.
Moller, et al., "Stochastic Rasterization using Time-Continuous Triangles", Graphics Hardware, Association for Computing Machinery, Inc., Jan. 2007, XP055130725, DOI: 10.2312/EGGH/EGGH07/007-016, Retrieved from the Internet: URL: http://dx.doi.org/10.2312/EGGH/EGGH07/007-016 [retrieved on Jun. 30, 2015], 11 pp.
Navarro, et al., "Motion Blur Rendering: State of the Art", Computer Graphics Forum, vol. 30, No. 1, Jan. 26, 2011, XP055198342, ISSN:0167-7055, pp. 3-26.
Sung, et al., "Spatial-Temporal Antialiasing", Apr.-Jun. 2002, IEEE Transactions on Visualization and Computer Graphics, XP011094451, ISSN: 1077-2626, pp. 144-153.
Cook, et al., "Stohastic Sampling in Computer Graphics," ACM Transactions on Graphics, vol. 5, No. 1, Jan. 1986, pp. 51-72.
McGuire, et al., "Real-time Stochastic Rasterization on Conventional GPU Architectures," High Performance Graphics, Jun. 25-27, 2010, 10 pp.
Response to Written Opinion dated Jul. 13, 2015, from International Application No. PCT/US2015/025896, filed on Feb. 15, 2016, 6 pp.
Second Written Opinion from International Application PCT/US2015/025896, dated Apr. 15, 2016, 6 pp.
Response to Second Written Opinion dated Apr. 15, 2016, from International Application No. PCT/US2015/025896, filed on Jun. 13, 2016, 3 pp.
International Preliminary Report on Patentability from International Application No. PCT/US2015/025896, dated Jul. 6, 2016, 7 pp.

\* cited by examiner

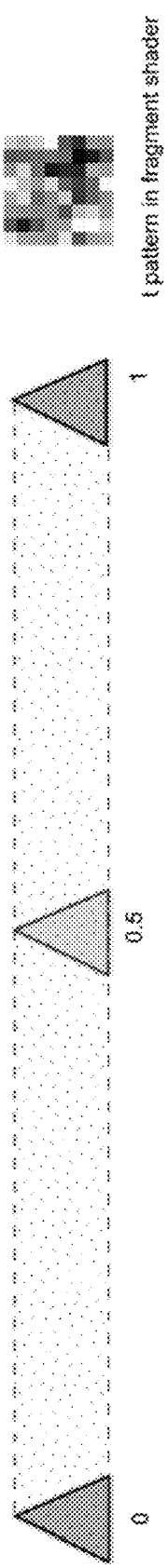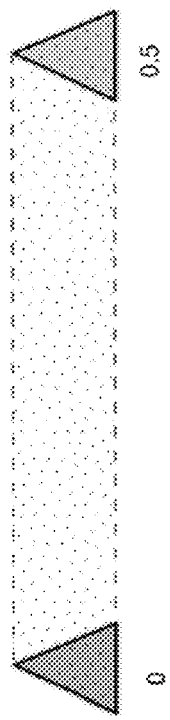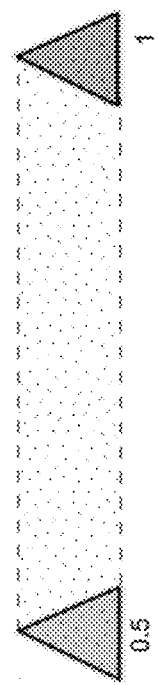
FIG. 6A
FIG. 6B
FIG. 6C

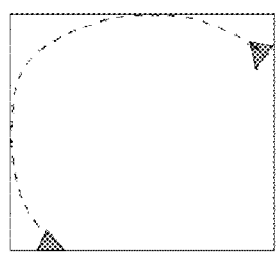
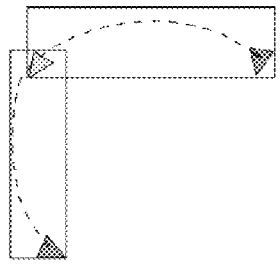
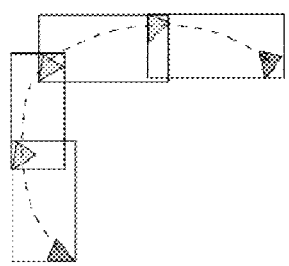
FIG. 7A  FIG. 7B  FIG. 7C
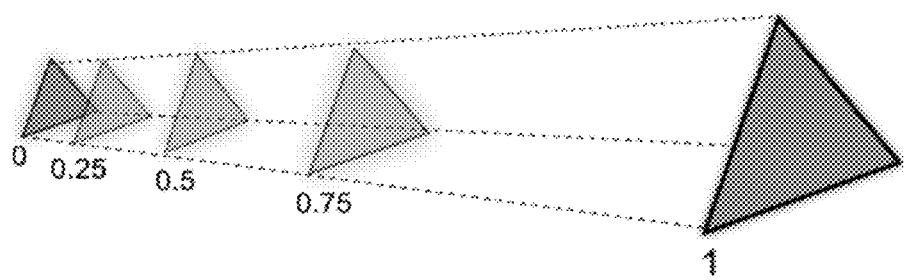
FIG. 8

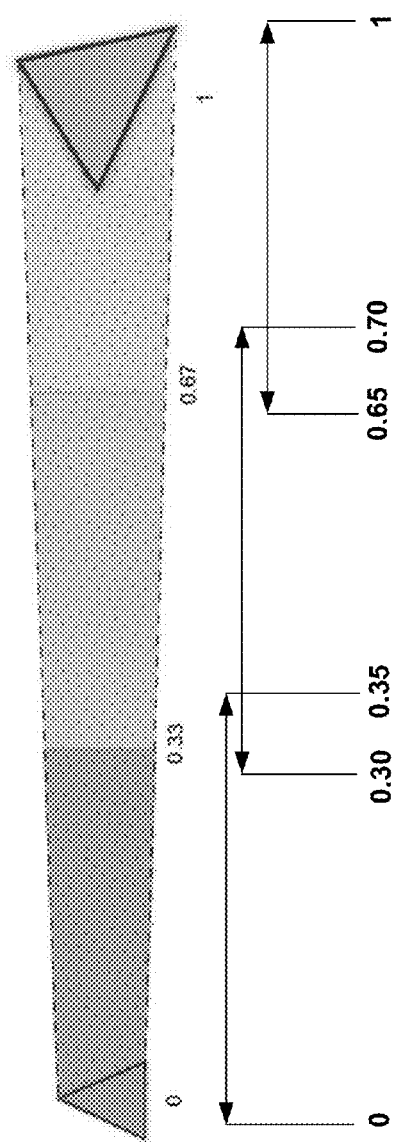
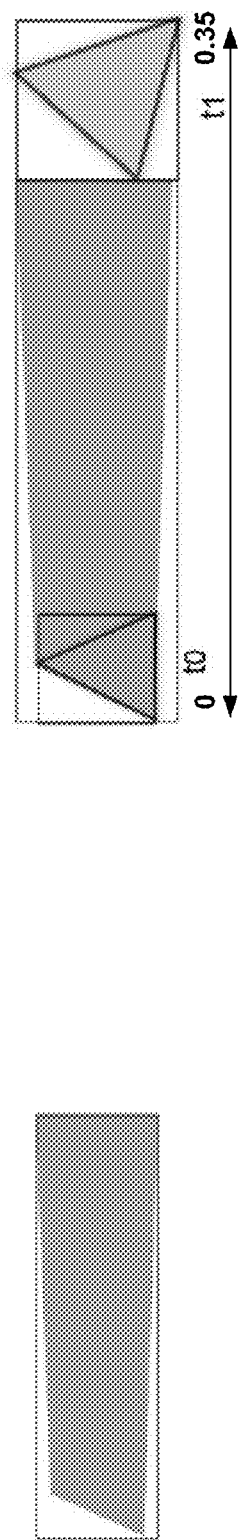
FIG. 9
FIG. 10A
FIG. 10B

STOCHASTIC RASTERIZATION USING ENHANCED STENCIL OPERATIONS ON A GRAPHICS PROCESSING UNIT (GPU)

This application claims the benefit of U.S. Provisional Patent Application No. 61/979,931, filed Apr. 15, 2014, the entire content of which is incorporated herein by reference.

TECHNICAL FIELD

This disclosure relates to graphics processing techniques, and more particularly, to stochastic rasterization techniques.

BACKGROUND

A graphics processing unit (GPU) may use motion blur (e.g., motion defocus) effects for reducing and/or eliminating temporal aliasing (e.g., hopping) in an animation. To implement motion blur effects, an object in a graphics scene may be sampled at multiple instances in time, and the samples at the multiple instances in time for the object may be combined to represent the object as part of a single graphics frame. To achieve motion blur, an object in a graphics scene may need to be sampled at a sampling rate that is greater than the rate at which the images in a graphics scene will be displayed (e.g., a sampling rate that is greater than the display frame rate).

Processing a graphics scene that is sampled at a sampling rate that is greater than the display frame rate may significantly increase the amount of data that needs to be processed by a GPU and/or increase the complexity of the processing implemented by the GPU. In some cases, the sampling and processing that needs to be performed for graphics scenes that are sampled at a sampling rate that is greater than the display frame rate may be too complicated and/or too slow for real-time graphics, particularly in processing environments that have a limited amount of computational resources, computational speed, and/or power resources, such as, e.g., a mobile device and/or a mobile phone.

SUMMARY

This disclosure describes examples for efficient implementation of stochastic rasterization techniques by leveraging a stencil test to determine whether a sample is to be rendered prior to execution of a pixel shader. For example, in stochastic rasterization, a bounding polygon (e.g., bounding shape) may define a relative frame-to-frame movement of a primitive, and the bounding polygon may include a plurality of sample values whose values are generally random within the bounding polygon, hence "stochastic." A graphics processing unit (GPU) may perform a stencil test on the sample values within the bounding polygon to discard at least some of the sample values prior to executing pixel shaders, which may reduce the number of unnecessary pixel shader executions resulting in more efficient stochastic rasterization (e.g., reduced GPU resources and faster rasterization).

Moreover, in some examples, the GPU or another processor may further partition the bounding polygon to reduce the processing of overlapping samples. Furthermore, in some examples, the bounding polygon may define a relative frame-to-frame movement of a cluster of primitives, rather than a single primitive (e.g., the bounding polygon defines a relative frame-to-frame movement of one or more primitives). In such examples, stochastic rasterization may improve because primitives are processed in groups, rather than one-at-a-time.

In one example, the disclosure describes a method of graphics processing, the method comprising determining a plurality of bounding polygons that together cover an animation timeline of one or more primitives from a first frame to a second frame, wherein each bounding polygon covers a portion of the animation timeline, and wherein the animation timeline corresponds to a movement of the one or more primitives, determining temporal values for samples within each of the bounding polygons based on a sampling pattern, prior to samples of respective bounding polygons being processed by a pixel shader of a graphics pipeline of a graphics processing unit (GPU), determining which samples within respective bounding polygons are to be further processed based on temporal values for the samples within respective bounding polygons and respective different threshold conditions for each of the respective bounding polygons, discarding from further processing a first set of the samples within a bounding polygon of the plurality of bounding polygons and maintaining a second set of the samples within the bounding polygon of the plurality of bounding polygons based on the determination, from a threshold condition for that bounding polygon, of which samples within the bounding polygon are to be further processed, and executing one or more instances of the pixel shader to process the second set of samples of the bounding polygon.

In one example, the disclosure describes a device for graphics processing, the device comprising a memory unit configured to store a sampling pattern, and a graphics processing unit (GPU) configured to determine a plurality of bounding polygons that together cover an animation timeline of one or more primitives from a first frame to a second frame, wherein each bounding polygon covers a portion of the animation timeline, and wherein the animation timeline corresponds to a movement of the one or more primitives, determine temporal values for samples within each of the bounding polygons based on the stored sampling pattern, prior to samples of respective bounding polygons being processed by a pixel shader of a graphics pipeline of GPU, determine which samples within respective bounding polygons are to be further processed based on temporal values for the samples within respective bounding polygons and respective different threshold conditions for each of the respective bounding polygons, discard from further processing a first set of the samples within a bounding polygon of the plurality of bounding polygons and maintain a second set of the samples within the bounding polygon of the plurality of bounding polygons based on the determination, from a threshold condition for that bounding polygon, of which samples within the bounding polygon are to be further processed, and execute one or more instances of the pixel shader to process the second set of samples of the bounding polygon.

In one example, the disclosure describes a computer-readable storage medium having instructions stored thereon that when executed cause one or more processors of a device for graphics processing to determine a plurality of bounding polygons that together cover an animation timeline of one or more primitives from a first frame to a second frame, wherein each bounding polygon covers a portion of the animation timeline, and wherein the animation timeline corresponds to a movement of the one or more primitives, determine temporal values for samples within each of the bounding polygons based on a sampling pattern, prior to samples of respective bounding polygons being processed by a pixel shader of a graphics pipeline of a graphics processing unit (GPU), determine which samples within respective bounding polygons are to be further processed based on temporal values for the samples within respective bounding polygons and respective different threshold conditions for each of the respective bounding polygons, discard from further processing a first set of the samples within a bounding polygon of the plurality of bounding polygons and maintain a second set of the samples within the bounding polygon of the plurality of bounding polygons based on the determination, from a threshold condition for that bounding polygon, of which samples within the bounding polygon are to be further processed, and execute one or more instances of the pixel shader to process the second set of samples of the bounding polygon.

In one example, the disclosure describes a device for graphics processing, the device comprising means for determining a plurality of bounding polygons that together cover an animation timeline of one or more primitives from a first frame to a second frame, wherein each bounding polygon covers a portion of the animation timeline, and wherein the animation timeline corresponds to a movement of the one or more primitives, means for determining temporal values for samples within each of the bounding polygons based on a sampling pattern, means for determining which samples within respective bounding polygons are to be further processed based on temporal values for the samples within respective bounding polygons and respective different threshold conditions for each of the respective bounding polygons, prior to samples of respective bounding polygons being processed by a pixel shader of a graphics pipeline of a graphics processing unit (GPU), means for discarding from further processing a first set of the samples within a bounding polygon of the plurality of bounding polygons and means for maintaining a second set of the samples within the bounding polygon of the plurality of bounding polygons based on the determination, from a threshold condition for that bounding polygon, of which samples within the bounding polygon are to be further processed, and means for executing one or more instances of the pixel shader to process the second set of samples of the bounding polygon.

The details of one or more examples are set forth in the accompanying drawings and the description below. Other features, objects, and advantages will be apparent from the description and drawings, and from the claims.

BRIEF DESCRIPTION OF DRAWINGS

FIGS. 6A-6C are a conceptual diagrams illustrating an example manner in which to generate bounding polygons in accordance with techniques described in this disclosure.

FIGS. 7A-7C are conceptual diagrams illustrating a manner in which to timeline segment movement of a primitive.

FIG. 8 is a conceptual diagram illustrating an example of a movement of a primitive towards a viewer.

FIG. 9 is a conceptual diagram illustrating an example of segmenting bounding polygon into spatially non-overlapping a plurality of polygons.

FIG. 10A is a conceptual diagram illustrating a bounding polygon segment and corresponding bounding box.

FIG. 10B is a conceptual diagram illustrating the intersection of dynamic bounding box of primitive with bounding box of original bounding polygon segment illustrated in FIG. 10A.

DETAILED DESCRIPTION

Figure 1:
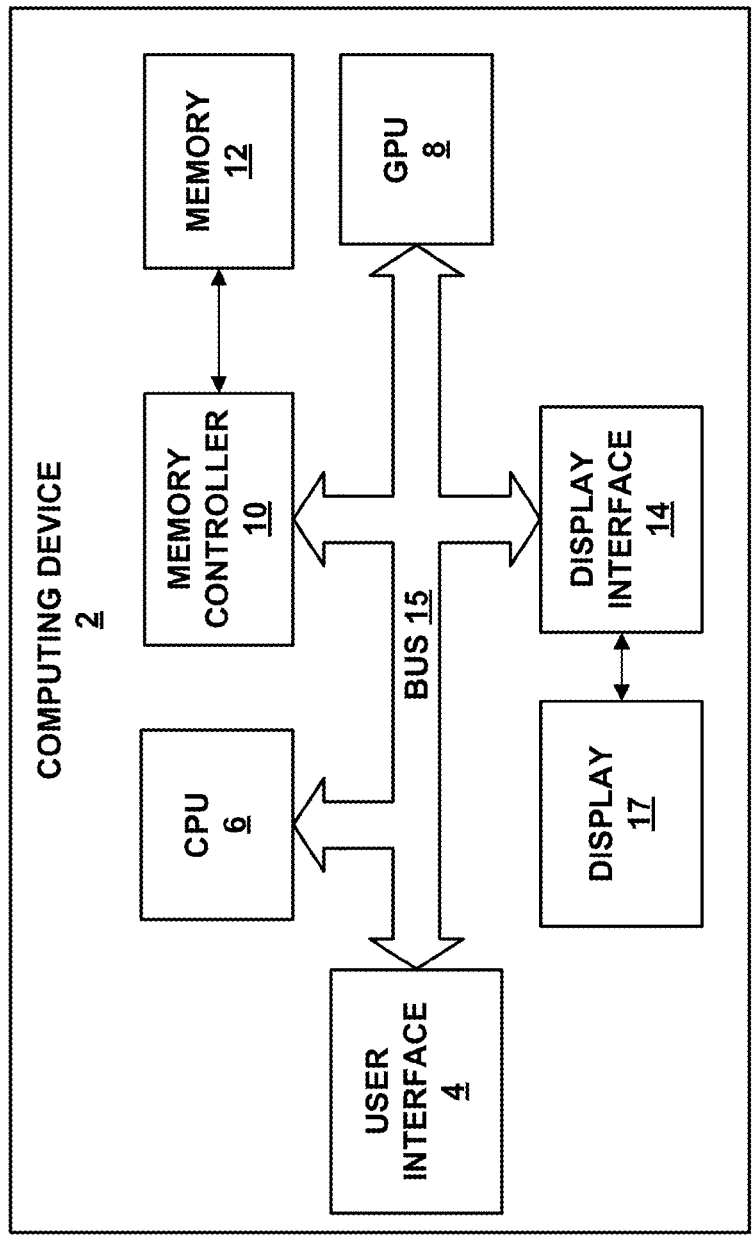
FIG. 1 is a block diagram illustrating an example computing device that may be used to implement the stochastic rasterization techniques of this disclosure.

In graphics processing, a graphics processing unit (GPU) generates graphical content at a certain frame rate (e.g., 30 frames per second (fps)). For fast moving objects, in the graphical content, the objects may appear as hopping, rather than having a smooth transition, frame-to-frame, from one location to another. Such hopping is referred to as temporal aliasing. Motion defocusing or motion blurring are proposed techniques to address such temporal aliasing.

For example, in video capture, a camera captures many frames (e.g., based on shutter speed) and averages the frames to achieve an effective frame rate. As an example, a camera may capture 150 frames per second, and average five frames to generate a composite frame, and repeat this process, for an effective frame rate of 30frames per second (e.g., 150 divided 5 equals 30). The averaging of the frames produces blurring in the final composite frame that appears like a tail on the fast moving object. This blurring then appears as a smooth movement of the object, rather than the object hopping from frame-to-frame.

Such a brute force approach of generating additional frames and then averaging for achieving the effective frame rate may not be practical in some cases. For example, due to power and processing time, a GPU may not be able to produce many additional frames on which averaging can be performed and still achieve the appropriate frame rate. This brute force approach may be considered as a high order rasterization approach that may be either too complicated or too slow for real-time graphics.

In some examples, rather than averaging many frames, the GPU may add blurring or defocusing to objects on a frame so that the object appears to be moving fast. One example way to add such blurring for purposes of creating the perception of movement is referred to as stochastic rasterization.

This disclosure describes techniques for performing stochastic rasterization with a graphics processing unit (GPU). Stochastic rasterization refers to the process of rasterizing a primitive based on a stochastic sampling pattern that specifies, for each of a plurality of sampling locations (e.g., pixel locations), a time instance of an animation timeline at which the primitive is to be sampled at the respective sampling location.

Stated another way, in graphics processing, a GPU constructs an object by an interconnection of a plurality of primitives such as triangles. As a triangle of the object moves from frame-to-frame (the movement of the triangles being an example of an animation timeline), the triangle may be considered to have been in many positions between the position in one frame and the position in a next frame. Although the GPU may not render the primitive in any of these intermittent positions, the primitive may be considered as passing through many time instances along the animation timeline.

As a simple example, assume that a primitive of an object is moving from left-to-right in the graphical content. In this example, in frame 0 at time 0, assume that the primitive of the object is at location 0, and then in frame 1 at time 33 milli-second (ms) (e.g., for 30 fps), assume that the primitive of the object is at location 1 (e.g., one unit distant to the right relative to frame 0). In this example, the animation timeline is movement of the primitive during the 33 ms from location 0 to location 1, but at time instance 16.5 ms along the animation timeline, the location of the primitive was location 0.5.

Accordingly, the respective time instance of the animation timeline specified for each of the pixels by the stochastic sampling pattern may be a respective time instance of a frame time interval of the animation timeline. A frame time interval may refer to a time interval of an animation timeline that is between two consecutive graphics frames that are rendered and displayed. In other words, the frame time interval may refer to a range of times between a first time instance of the animation timeline associated with a previous graphics frame that was rendered and displayed and a second time instance associated with a subsequent graphics frame to be rendered and displayed.

The stochastic sampling pattern may specify a temporal value to each of the samples (e.g., pixels) of a frame along the animation timeline. For instance, in the previous example, the stochastic sampling pattern may specify a temporal value to each of the samples of frame 1 along the animation timeline (e.g., the pixels that are located in the area in which the primitive moved from location 0 to location 1). The temporal value of each of the samples along the animation timeline may be a random value (hence, the term "stochastic") between a minimum and a maximum value. The randomness of the temporal values reduces aliasing effects, but increases noise. However, aliasing effects tend to more negatively affect viewer experience than noise.

Each of the temporal values may correspond to a time instance of the primitive along the animation timeline. As a basic example, assume that at time 0, the primitive is at location 0 in frame 0, and at time 1, the primitive is at location 1 in frame 1. In this example, at time instance 0.5, the primitive is at location 0.5. The temporal value of 0.5 corresponds to the time instance 0.5. In this example, the samples of frame 1 along the animation timeline (e.g., located between location 0 and location 1 of the path of the primitive) are assigned temporal values in a stochastic (e.g., random) manner. Accordingly, some of the temporal values will equal 0.5 and others will not.

In stochastic rasterization, the GPU determines a temporal value for a sample, and determines where the primitive corresponding to that temporal value would be located along the animation timeline. The GPU then determines whether that particular sample is located inside or outside that primitive. If the sample is within the primitive, the GPU renders the sample. Otherwise, the GPU discards the sample. As an example, assume that a sample located on the left end of the animation timeline has a temporal value of 0.5. In this example, the GPU may determine that at a time instance of 0.5, the primitive would be located in the middle of the animation timeline. The GPU may then determine that the sample located at the left end of the animation timeline having a temporal value of 0.5 is not inside the time instance of the primitive located in the middle of the animation timeline. In this case, the GPU would discard that sample.

It should be understood that a time instance of a primitive need not necessarily mean a rendered primitive. For example, between frame 0 at time 0 and frame 1 at time 1 there are many time instances of the primitive (e.g., at time 0.1, 0.2, 0.3, and so forth, at 0.05, 0.1, 0.15, and so forth, 0.2, 0.4, 0.6, and so forth, or other granularities). The primitives between the frames are conceptual primitives. They are not actual primitives that are rendered. But, in stochastic rasterization, information of where the primitive would have been conceptually located at a time instance (i.e., sampling location of the primitive) is used to determine which samples are to be rendered.

For example, to perform stochastic rasterization, a rasterizer of the GPU may rasterize a bounding polygon that covers the primitive to be rendered over a range of time instances along an animation timeline. In other words, the bounding polygon (also referred to as a bounding shape) bounds the movement path of the primitive along the animation timeline. As a basic example, assume that the animation timeline of a primitive of height X is rightward by a distance of Y (e.g., from a first frame to a second frame, the primitive with height X moved rightward a distance of Y). For this example, a bounding polygon may be a rectangle (or possibly a trapezoid) of height X and a width of Y because such a bounding polygon covers the primitive to be rendered over a range of time instances (e.g., from the time of the first frame to the time of the second frame) along an animation timeline (e.g., movement rightward).

Rasterizing the bounding polygon may generate a plurality of samples that correspond to the bounding polygon. A pixel shader may, for each of the sampling locations of the bounding polygon, shade the sample at the respective sampling location based on temporal position from the stochastic sampling pattern and relative position mapping to the primitive at that temporal position. For example, a pixel shader may determine a time instance of the primitive (e.g., where the primitive would be located on the animation timeline, also referred to as temporal position of the primitive) based on a temporal value of a sample.

The pixel shader may then determine whether the sample being processed is inside or outside the time instance of the primitive (e.g., inside or outside the primitive at that temporal position of the primitive). If the sample is outside of the primitive at that temporal positon, the pixel shader may discard the sample corresponding to the sampling location such that further processing is not performed on the sample by the pixel shader or by subsequent stages of the graphics pipeline. If the sample is inside of the primitive at that temporal position, the pixel shader may maintain the sample for further processing.

Stochastic rasterization may result in a relatively large number of samples (e.g., pixels) that are processed by a pixel shader stage of a pixel processing pipeline, but will ultimately not contribute to the resulting graphics image. Typically, such samples may be discarded by the pixel shader stage of the pixel processing pipeline. However, discarding such samples at the pixel shader stage may still result in a large number of unnecessary invocations of the pixel shader, which may reduce the performance of the pixel shader stage of the graphics pipeline.

In the techniques described in this disclosure, for performing stochastic rasterization, a GPU may use a stencil test to selectively discard samples (e.g., pixels) from a pixel processing pipeline of a GPU prior to the samples reaching the pixel shader stage of the pixel processing pipeline. As noted above, stochastic rasterization may result in a relatively large number of samples (e.g., pixels) that are processed by a pixel shader stage of a pixel processing pipeline, but will ultimately not contribute to the resulting graphics image. By selectively discarding such samples prior to the pixel shader stage of the pixel processing pipeline, the number of samples processed by the pixel shader stage may be reduced, thereby avoiding a large number of unnecessary invocations of the pixel shader. In this way, the performance of a GPU that performs stochastic rasterization may be improved.

In some examples, the stencil test may use a stencil mask that is determined based on a stochastic sampling pattern (e.g., a stochastic sampling mask) to determine which pixels are to be discarded. For example, as described in more detail below, rather than utilizing a single bounding polygon for a primitive, the GPU may utilize a plurality of bounding polygons, where each bounding polygon covers a portion of the animation timeline. The stencil mask may be formed such that only a subset of the samples pass through for a particular bounding polygon based on an animation timeline covered by the bounding polygon. In this manner, the number of times the pixel shader is invoked is reduced, promoting efficient stochastic rasterization.

In other words, in some examples, multiple bounding polygons and/or multiple bounding polygon partitions that are each associated with a respective time interval that is smaller than the frame time interval may be used to perform stochastic rasterization. In such cases, it may be known in advance that samples associated with instances in time that are outside of the time interval associated with a respective bounding polygon and/or bounding polygon partition will always be discarded when processing the samples for the respective bounding polygon and/or bounding polygon partition.

According to some aspects of this disclosure, the values of a stencil mask that is used to perform a stencil test may be determined such that sampling locations which are associated with instances in time that are outside of the time interval associated with a respective bounding polygon and/or bounding polygon partition will fail the stencil test, thereby causing the samples associated with such sampling locations to be discarded. In this way, the performance of a GPU that uses bounding polygons and/or bounding polygon partitions that are associated with time intervals that are smaller than the frame time interval may be improved.

In some cases, timeline segmentation and/or bounding polygon partitioning may be used to perform stochastic rasterization. Timeline segmentation may involve subdividing the animation time interval between consecutive graphics frames into a plurality of smaller, segmented time intervals that collectively span the animation time interval. A bounding polygon may be generated and rasterized for each of the segmented time intervals, and shading may be performed for each of the rasterized bounding polygons.

Bounding polygon partitioning may involve subdividing the bounding polygon into a plurality of smaller, bounding polygon partitions that collectively span the samples covered by the original bounding polygon. Each of the bounding polygons partitions may be rasterized, and shading may be performed for each of the rasterized bounding polygons.

When performing stochastic rasterization, overlapping primitives may significantly increase the number of samples that are processed, but ultimately discarded. As the primitives become smaller, the problem may become worse.

According to some aspects of this disclosure, a plurality of primitives may be grouped together to form a cluster of primitives, and a bounding polygon (e.g., a bounding box) may be formed that encompasses all of the primitives in the cluster of primitives. Stochastic rasterization may then be performed with respect to bounding polygon of cluster of primitives. Timeline segmentation and bounding polygon partition may consider cluster of primitives. Stencil operations may stay the same to discard the sample of each bounding polygon, and the pixel shader may determine if each sample of bounding polygon is inside of any primitive of cluster at the temporal position (e.g., time instance of the primitive), and shade the sample accordingly or discard the sample if outside of all primitives at that temporal position. By using a bounding polygon that encompasses a plurality of primitives to perform stochastic rasterization, instead of using individual bounding polygons for each of the primitives, which may overlap each other, the number of processes on each sample on screen may be reduced. In this way, the performance of a graphics processing system that performs stochastic rasterization may be improved.

FIG. 1 is a block diagram illustrating an example computing device 2 that may be used to implement the stochastic rasterization techniques of this disclosure. Computing device 2 may comprise a personal computer, a desktop computer, a laptop computer, a computer workstation, a video game platform or console, a wireless communication device (such as, e.g., a mobile telephone, a cellular telephone, a satellite telephone, and/or a mobile phone handset), a landline telephone, an Internet telephone, a handheld device such as a portable video game device or a personal digital assistant (PDA), a personal music player, a video player, a display device, a television, a television set-top box, a server, an intermediate network device, a mainframe computer or any other type of device that processes and/or displays graphical data.

As illustrated in the example of FIG. 1, computing device 2 includes a user input interface 4, a central processing unit (CPU) 6, a graphics processing unit (GPU) 8, a memory controller 10, a memory 12, a display interface 14, a display 17 and a bus 15. User input interface 4, CPU 6, GPU 8, memory controller 10, and display interface 14 may communicate with each other using bus 15. It should be noted that the specific configuration of buses and communication interfaces between the different components shown in FIG. 1 is merely exemplary, and other configurations of computing devices and/or other graphics processing systems with the same or different components may be used to implement the techniques of this disclosure.

User input interface 4 may allow one or more user input devices (not shown) to be communicatively coupled to computing device 2. The user input devices may allow a user to provide input to computing device 2 via user input interface 4. Example user input devices include a keyboard, a mouse, a trackball, a microphone, a touch pad, a touch-sensitive or presence-sensitive display, or another input device. In examples where a touch-sensitive or presence-sensitive display is used as a user input device, all or part of user input interface 4 may be integrated with display 17.

CPU 6 may comprise a general-purpose or a special-purpose processor that controls operation of computing device 2. CPU 6 may execute one or more software applications. The software applications may include, for example, a video game application, a graphics application, a word processor application, an email application, a spread sheet application, a media player application, a graphical user interface application, an operating system, or any other type of software application or program.

GPU 8 may be configured to render and display graphics data that is received from CPU 6. In some examples, GPU 8 may be configured to perform graphics operations to render one or more graphics primitives to display 17. In such examples, when one of the software applications executing on CPU 6 requires graphics processing, CPU 6 may provide graphics data to GPU 8 and issue one or more graphics commands to GPU 8. The graphics commands may include draw call commands, GPU state programming commands, memory transfer commands, blitting commands, etc. The graphics data may include vertex buffers, texture data, surface data, etc. In some examples, CPU 6 may provide the commands and graphics data to GPU 8 by writing the commands and graphics data to memory 12, which may be accessed by GPU 8.

GPU 8 may, in some instances, be built with a highly-parallel structure that provides more efficient processing of vector operations than CPU 6. For example, GPU 8 may include a plurality of processing elements that are configured to operate on multiple vertices, control points, pixels and/or other data in a parallel manner. The highly parallel nature of GPU 8 may, in some instances, allow GPU 8 to process tasks that that include a high degree of parallelism more quickly than CPU 6. In addition, the highly parallel nature of GPU 8 may, in some examples, allow GPU 8 to render graphics images (e.g., GUIs and two-dimensional (2D) and/or three-dimensional (3D) graphics scenes) onto display 17 more quickly than rendering the images using CPU 6.

GPU 8 may, in some instances, be integrated into a motherboard of computing device 2. In other instances, GPU 8 may be present on a graphics card that is installed in a port in the motherboard of computing device 2 or may be otherwise incorporated within a peripheral device configured to interoperate with computing device 2. In further instances, GPU 8 may be located on the same microchip as CPU 6 forming a system on a chip (SoC). GPU 8 may include one or more processors, such as one or more microprocessors, application specific integrated circuits (ASICs), field programmable gate arrays (FPGAs), digital signal processors (DSPs), or other equivalent integrated or discrete logic circuitry.

In some examples, GPU 8 may include a GPU cache, which may provide caching services for all or a portion of memory 12. In such examples, GPU 8 may use the cache to process data locally using a local storage, instead of off-chip memory. This allows GPU 8 to operate in a more efficient manner by reducing the need for GPU 8 to access memory 12 via bus 15, which may experience heavy bus traffic, during each read and write command. In some examples, however, GPU 8 may not include a separate cache, but instead utilize memory 12 via bus 15. The GPU cache may include one or more volatile or non-volatile memories or storage devices, such as, e.g., random access memory (RAM), static RAM (SRAM), dynamic RAM (DRAM), etc.

Memory controller 10 facilitates the transfer of data going into and out of memory 12. For example, memory controller 10 may receive memory read and write commands, and service such commands with respect to memory 12 in order to provide memory services for the components in computing device 2. Memory controller 10 is communicatively coupled to memory 12. Although memory controller 10 is illustrated in the example computing device 2 of FIG. 1 as being a processing module that is separate from both CPU 6 and memory 12, in other examples, some or all of the functionality of memory controller 10 may be implemented on one or both of CPU 6 and memory 12.

Memory 12 may store program modules and/or instructions that are accessible for execution by CPU 6 and/or data for use by the programs executing on CPU 6. For example, memory 12 may store program code and graphics data associated with the applications executing on CPU 6. Memory 12 may additionally store information for use by and/or generated by other components of computing device 2. For example, memory 12 may act as a device memory for GPU 8 and may store data to be operated on by GPU 8 as well as data resulting from operations performed by GPU 8. For example, memory 12 may store any combination of buffer objects, pipe data, or the like. In addition, memory 12 may store command streams for processing by GPU 8 (e.g., command queues). Memory 12 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), Flash memory, a magnetic data medium or an optical storage medium. In some examples, memory 12 may correspond to all or part of a data storage system.

CPU 6 and/or GPU 8 may store rasterized image data in a frame buffer that is allocated within memory 12. Display interface 14 may retrieve the data from the frame buffer and configure display 17 to display the image represented by the rasterized image data. In some examples, display interface 14 may include a digital-to-analog converter (DAC) that is configured to convert the digital values retrieved from the frame buffer into an analog signal consumable by display 17. In other examples, display interface 14 may pass the digital values directly to display 17 for processing.

Display 17 may include a monitor, a television, a projection device, a liquid crystal display (LCD), a plasma display panel, a light emitting diode (LED) array, a cathode ray tube (CRT) display, electronic paper, a surface-conduction electron-emitted display (SED), a laser television display, a nanocrystal display or another type of display unit. Display 17 may be integrated within computing device 2. For instance, display 17 may be a screen of a mobile telephone handset or a tablet computer. Alternatively, display 17 may be a stand-alone device coupled to computing device 2 via a wired or wireless communications link. For instance, display 17 may be a computer monitor or flat panel display connected to a personal computer via a cable or wireless link.

Bus 15 may be implemented using any combination of bus structures and bus protocols including first, second and third generation bus structures and protocols, shared bus structures and protocols, point-to-point bus structures and protocols, unidirectional bus structures and protocols, and bidirectional bus structures and protocols. Examples of different bus structures and protocols that may be used to implement bus 15 include, e.g., a HyperTransport bus, an InfiniBand bus, an Advanced Graphics Port bus, a Peripheral Component Interconnect (PCI) bus, a PCI Express bus, an Advanced Microcontroller Bus Architecture (AMBA) Advanced High-performance Bus (AHB), an AMBA Advanced Peripheral Bus (APB), and an AMBA Advanced eXentisible Interface (AXI) bus. Other types of bus structures and protocols may also be used.

In some examples, the techniques for performing stochastic rasterization described in this disclosure may be implemented in one or both of CPU 6 and GPU 8. For example, CPU 6 may execute one or more software applications or programs (e.g., a GPU driver) that perform all or part of any of the stochastic rasterization techniques of this disclosure. As another example, GPU 8 may include a rasterization unit and/or a pixel processing pipeline that is configured to perform all or part of any of the stochastic rasterization techniques of this disclosure. As another example, GPU 8 may include a programmable shader unit that is configured to execute one or more shader programs that perform all or part of any of the stochastic rasterization techniques of this disclosure. In additional examples, memory 12 may store one or more programs for execution by CPU 6 and/or GPU 8 that perform any of the stochastic rasterization techniques of this disclosure.

In some examples, CPU 6 and/or a GPU driver executing on CPU 6 may perform one or more aspects of this disclosure. For instance, CPU 6 and GPU 8 may together perform the real-time stochastic rasterization techniques. As described above, stochastic rasterization may provide quality motion blur to create the perception of movement of an object, and may perform better and with less computational resources than post-processing methods such as averaging many frames. Although stochastic rasterization functions well for motion blur for constant velocity objects, the techniques described in this disclosure are not limited to examples of constant velocity objects. Moreover, in some examples, GPU 8 may be configured to perform 8X multi-sample anti-aliasing (MSAA), which is generally sufficient for stochastic rasterization. For instance, as described above, stochastic rasterization tends to limit the effects of aliasing at the cost of noise, but the effects of aliasing is more drastic than noise.

Motion blur may be useful to avoid issues associated with hopping, where in hopping an object appears to hop from frame-to-frame, rather than smoothly transition from frame-to-frame (i.e., the motion blur causes the viewer to perceive as if the object is moving smoothly rather than hopping). To apply such motion blur, CPU 6 (e.g., through execution of a GPU driver) may generate bounding polygons for primitives and/or clusters of primitives. The bounding polygons may cover an animation timeline of one or more primitives from a first frame to a second frame (e.g., a movement of the one or more primitives). For instance, if the one or more primitives are moving upwards, downwards, rightwards, or leftwards, the bounding polygon may be rectangular with one edge of the bounding polygon touching the location in the second frame of the one or more primitives in the first frame and the another edge of the bounding polygon touching the location in the second frame of the one or more primitives in the second frame. In other words, for a rightward moving primitive, the left edge of the rectangular bounding polygon is at the location in the second frame that is the same location as the location of primitive in the first frame, and the right edge of the rectangular bounding polygon is at the location in the second frame of the primitive.

In some examples, CPU 6 (e.g., executing a GPU driver) may partition a bounding polygon into a plurality of bounding polygon partitions, and determine time intervals for each of the bounding polygon partitions. As a further example, CPU 6 (e.g., executing a GPU driver) may subdivide an animation timeline into a plurality of segmented time intervals (i.e., timeline segments). In any of these examples, CPU 6 may output information of the bounding polygons to GPU 8, and GPU 8 may determine one or more bounding polygons based on the received information.

For each of the bounding polygons, GPU 8 may determine temporal values for samples (e.g., pixels) within the bounding polygons based on a sampling pattern. The sampling pattern may be a pattern defined by CPU 6 (e.g., by a GPU driver, by an application, or a pre-programmed pattern). The sampling pattern may be considered as a small, fixed tile (e.g., 8×8, 32×32, as some examples), and may be the same for the rendering process of the frame.

Each location of the sampling pattern may be assigned a value (e.g., between 0 and 1) and in some examples, the values in the sampling pattern may be random, but evenly distributed. Accordingly, one example of the sampling pattern is a "stochastic" sampling pattern; however, other types of sampling patterns are possible. For ease of description, the techniques are described with respect to a stochastic sampling pattern.

Some techniques store the stochastic sampling pattern in a texture buffer and determine the temporal values for the samples within the bounding polygons based on the values stored in the texture buffer. In the techniques described in this disclosure, GPU 8 may load the stochastic sampling pattern in a stencil buffer, and in some examples, in addition to loading the stochastic sampling pattern in the texture buffer. By loading the stochastic sampling pattern, GPU 8 may perform a stencil test to discard samples that do not need to be further processed prior to processing by a pixel shader, as described in more detail.

The stencil buffer may be stored in the cache of GPU 8 or in memory 12. The stencil buffer may be a two-dimensional buffer with a plurality of storage locations. The size of the stencil buffer may be large enough to store the pixel values for each of the pixels that is to be displayed. For example, each storage location in the stencil buffer may correspond to a location of a sample on a frame. Because the stochastic sampling pattern is a relatively small sized tile (e.g., much smaller than the size of the stencil buffer), GPU 8 may repeat the stochastic sampling pattern across the stencil buffer.

The value stored at a particular location in the stencil buffer may be a temporal value of a sample in the bounding polygon having a corresponding location in the frame. For example, assume that a sample located at (100, 100) in a frame is also within a bounding polygon. In this example, the temporal value of the sample equals the value stored in location (100, 100) within the stencil buffer.

A temporal value of a sample indicates with which time instance of the one or more primitives that sample is associated. In other words, the temporal value of the sample indicates with which temporal position of the one or more primitives that sample is associated. However, a sample may not necessarily be covered by a time instance with which it is associated (i.e., the temporal position of the primitive may not cover a sample having a temporal value that corresponds to that temporal position). For example, at a time instance halfway between frame 0 and frame 1, a primitive would be at a halfway location within the bounding polygon. Again, this primitive in a halfway location in the bounding polygon is not rendered, but conceptually, the halfway time between the time represented at frame 0 and the time represented by frame 1, the primitive would be located halfway in the bounding polygon.

In this example, assume that the time instance of this conceptual primitive is 0.5, and the location of the conceptual primitive is halfway in the bounding polygon (e.g., temporal position is 0.5). All samples having a temporal value of 0.5 are associated with this conceptual primitive. However, not all samples having a temporal value of 0.5 are located halfway in the bounding polygon. For instance, due to the stochastic nature of the temporal values, samples having a temporal value of 0.5 may be distributed throughout the bounding polygon.

In stochastic rasterization, GPU 8 may determine for a sample whether that sample is associated with a particular time instance (e.g., temporal position) of the primitive based on the temporal value of the sample. GPU 8 may then determine whether that sample is covered or not by the primitive at that time instance. If the sample is covered, GPU 8 renders the sample. If the sample is not covered, GPU 8 discards the sample. GPU 8 repeats such steps for each sample. In this way, GPU 8 renders a few samples per time instance of the primitive. This results in the appearance of motion blurring, and smooth movement of the object that is formed by the primitive.

Figure 2:
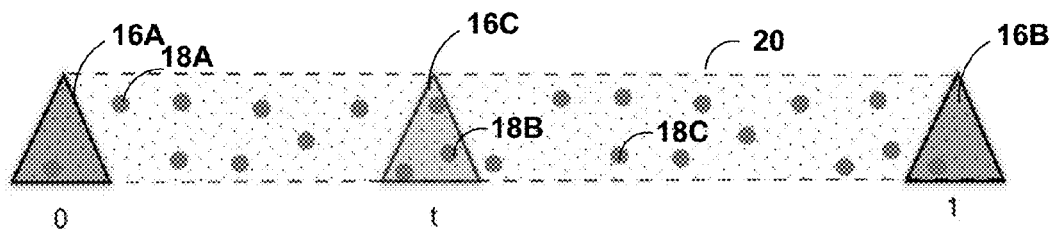
FIG. 2 is a conceptual diagram illustrating an example bounding polygon including samples within the bounding polygon.

FIG. 2 is a conceptual diagram illustrating an example bounding polygon including samples within the bounding polygon. For example, FIG. 2 illustrates bounding polygon 20 that bounds primitive 16A and 16B. It should be understood that primitive 16A and 16B are the same primitive and that FIG. 2 is illustrating that a triangular primitive at time instance 0 (e.g., primitive 16A) traveled rightward to be located at the location of primitive 16B at time instance 1. FIG. 2 may be considered as illustrating frame 1, to which motion blurring is being added.

In this example, primitive 16B will be rendered as part of frame 1, and primitive 16A is illustrated conceptually. For instance, primitive 16A illustrates the location of where the primitive was in frame 0, and primitive 16B illustrates the location of where the primitive is in frame 1. As illustrated, bounding polygon 20 extends, in frame 1, from the corresponding location of where primitive 16A is located in frame 0 to where primitive 16B is located in frame 1.

Primitive 16C is a conceptual primitive illustrating the time instance t of where the primitive would have been located in bounding polygon 20 (e.g., temporal position of the primitive at time instance t). The time instance t of primitive 16C represents a time between frame 0 and frame 1. Therefore, GPU 8 may not render primitive 16C in a frame, but conceptually it is possible to determine where primitive 16C is located. For example, the application executing on CPU 6 may define the velocity and/or acceleration of the primitive, and frame 0 and frame 1 may define set time instances (e.g., 33 milli-seconds of separation, assuming 30 fps). Based on the velocity and/or acceleration and the time between frame 0 and frame 1, it may be possible to determine the temporal position of primitive 16C.

Bounding polygon 20 includes a plurality of samples having different temporal values. For ease of illustration, some of the samples having the same temporal value are expanded to assist with visualizing. For instance, FIG. 2 illustrates samples 18 each having the same temporal value, and for ease, samples 18A, 18B, and 18C are called out with reference numerals. GPU 8 may determine the temporal values of the samples of bounding polygon 20, including samples 18, based on a stochastic sampling pattern as described above.

In the example illustrated in FIG. 2, assume that samples 18A, 18B, and 18C all have the same temporal value (e.g., 0.3), and the time instance of primitive 16C is 0.3. In this example, for sample 18A, GPU 8 may determine the temporal value of sample 18A, and then determine the temporal position of the primitive associated with sample 18A. For instance, GPU 8 may determine the temporal position of the primitive to be at the time instance of primitive 16C. GPU 8 may determine whether sample 18A is inside or outside (e.g., covered or not covered) by primitive 16C. In this case, because sample 18A is not covered by primitive 16C, GPU 8 may discard sample 18A from further processing.

Similarly, for sample 18C, GPU 8 may determine the temporal value of sample 18C, and then determine the temporal position of the primitive associated with sample 18C. For instance, as above, GPU 8 may determine the temporal position of the primitive to be at the time instance of primitive 16C. GPU 8 may determine whether sample 18C is inside or outside (e.g., covered or not covered) by primitive 16C. In this case, because sample 18C is not covered by primitive 16C, GPU 8 may discard sample 18C from further processing. It should be understood that GPU 8 may process each sample in various orders, and therefore, GPU 8 may not process sample 18C after sample 18A, and may process sample 18B before sample 18C.

For sample 18B, however, GPU 8 may determine that sample 18B is covered by the time instance of primitive 16C, and that sample 18B is associated with primitive 16C. In this example, GPU 8 may further process sample 18B such as render sample 18B as part of the final displayed frame.

In this manner, some of the samples in bounding polygon 20 are rendered and others are not. As only a few samples are rendered in bounding polygon 20, it would appear as motion blurring.

One way to determine which primitives are to be rendered is by executing a pixel shader configured to make such a determination. For example, GPU 8 may implement a graphics processing pipeline, and the graphics processing pipeline includes a pixel shader stage. In the pixel shader stage, GPU 8 executes instances of a pixel shader for each sample within bounding polygon 20. Part of the functionality of the pixel shader may be to determine whether the sample that it is processing is covered by the time instance of primitive (e.g., temporal position of the primitive) with which it is associated. If the pixel shader determines that the sample it is processing is not covered, the pixel shader may discard that sample from further processing. Otherwise, the pixel shader may further process the sample (e.g., determine color for the sample and render the sample for display).

Figure 3:
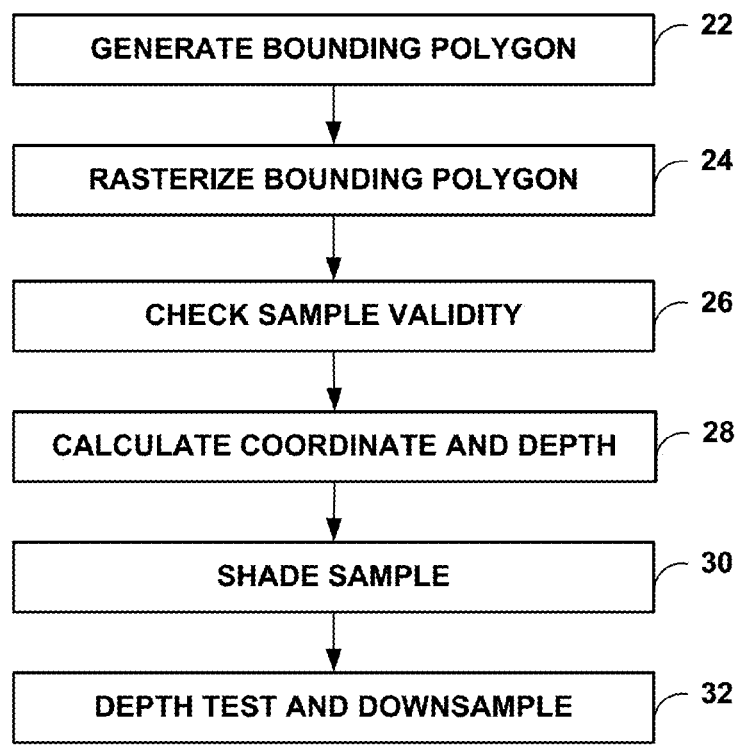
FIG. 3 is a flowchart illustrating an example of stochastic rasterization.

FIG. 3 is a flowchart illustrating an example of stochastic rasterization according to the techniques of the disclosure. In FIG. 3, a geometry shader in the graphics processing pipeline of GPU 8 may bound the primitives (e.g., triangles) in the screen-space extent due to its shape (xy), motion (t) (22). In other words, the geometry shader may generate bounding polygon that covers the animation timeline (e.g., screen-space extent) based on a movement of the primitive (e.g., motion (t)). Defocusing may add further blurring and is optional.

A rasterizer (sometimes referred to as GRAS) may rasterize the bounding polygon (24). A pixel shader may determine temporal values of samples in the bounding polygon based on a stochastic sampling pattern as part of a texture read, where the values from the stochastic sampling pattern are stored in the texture buffer. However, in the techniques described in this disclosure, the stochastic sampling pattern may be stored in the stencil buffer to leverage the stencil test for efficient stochastic rasterization.

A pixel shader (sometimes referred to as fragment shader) may check each samples validity (26). For example, the pixel shader may perform some inside-outside test per sample based on the xy and t values with a predefined random t. In other words, the pixel shader may be determine whether the sample that it is processing is associated with the time instance of the primitive that covers the sample in the bounding polygon.

The pixel shader may shade the samples that pass with predefined random t values (28). For example, the pixel shader may shade the samples that pass with predefined random t values. In other words, if the sample being processed is outside of primitive at the temporal position, the pixel shader may not perform further tasks on that sample. Otherwise, the pixel shader may further process the sample (e.g., shade the sample including determining color for the sample and render the sample for display).

There may be additional processing on the sample that the pixel shader outputs, including depth test and downsampling (32). For example, a depth test after the pixel shader may determine any of the samples outputted by the pixel shader are occluded and may discard those pixels from rendering. An anti-aliasing filter (such as an MSAA filter) may downsample and remove any aliasing.

However, there may be issues with such stochastic rasterization techniques. In general, the number of samples that are actually further processed by each instantiation of the pixel shader are fairly low, but all samples within the bounding polygon (e.g., bounding polygon 20) are processed by an instantiation of the pixel shader. For example, GPU 8 executes an instance of a pixel shader for each sample to determine whether further processing of that sample is needed, but only for a few samples does further processing occur, resulting in unnecessary invocations of the pixel shader.

Such issues become more pronounced because of the single instruction multiple data (SIMD) capabilities of GPU 8 and for smaller sized primitives. For instance, in the SIMD capabilities, each fiber corresponds to one instantiation of the execution of a pixel shader for one sample, and a plurality of fibers forms a thread (e.g., 32 fibers forms a thread for processing 32 samples in parallel). One condition may be that all fibers of a thread need to complete respective tasks until all fibers are free. Therefore, if only a few samples of the 32 samples are going to be further processed, then all other instantiations of the pixel shader remain idle to allow a few to be further processed. Also for smaller sized primitives, the probability that a sample will belong to a time instance of that primitive is relatively small, further reducing the chances of a sample actually being further processed by an instantiation of the pixel shader.

Another issue with some of these techniques for stochastic rasterization is that proximate primitives may have the same animation timeline, but a bounding polygon for each primitive is generated and the stochastic rasterization is applied. Therefore, essentially the same animation timeline is rasterized multiple times with different bounding polygons.

Figure 4:
FIG. 4 is a conceptual diagram illustrating an example of an animation timeline for a plurality of primitives.

FIG. 4 is a conceptual diagram illustrating an example of an animation timeline for a plurality of primitives. In FIG. 4, primitive 34A and 36A are neighboring and have the same general animation timeline, resulting in primitive 34B and 36B. In some techniques, there would be a bounding polygon that covers primitive 34A and 34B, and another bounding polygon that covers primitive 36A and 36B, and the above described process would be performed for both bounding polygons. The overlapping primitives in the middle of FIG. 4 illustrate how the bounding polygons are overlapping the primitives multiple times along the motion direction (e.g., primitive movement). In this case, each sample in overlapping region is processed by the pixel shader multiple times meaning the rate of valid samples that are further processed is even more reduced. As above, this issue is even more pronounced when there are smaller sized primitives.

The techniques described in this disclosure may reduce the number of samples for which the pixel shader needs to be invoked, prior to the pixel shader stage in GPU 8. For example, GPU 8 may be configured to selectively discard samples from a pixel processing pipeline of GPU 8 prior to the samples arriving at a pixel shader stage of the pixel processing pipeline based on a stencil test. As described above, GPU 8 may load the stochastic sampling pattern in a stencil buffer (including repeating the stochastic sampling pattern across the stencil buffer). Accordingly, the values of the stencil buffer may be determined based on a stochastic sampling pattern, and the values in the stencil buffer may correspond to temporal values of samples in the bounding polygon based on the location of the sample in the frame and the location of the value in the stencil buffer.

In one or more examples, GPU 8 may utilize a stencil test based on the values stored in the stencil buffer to selectively discard samples before the pixel shader. By selectively discarding samples prior to the pixel shader stage of the pixel processing pipeline, the number of samples processed by the pixel shader stage may be reduced, thereby avoiding a large number of unnecessary invocations of the pixel shader. In this way, the performance of GPU 8 when performing stochastic rasterization may be improved.

For example, as described in more detail below, rather than utilizing a single bounding polygon that covers the entire animation timeline of one or more primitives, GPU 8 may determine a plurality of bounding polygons that together cover an animation timeline one or more primitives from a first frame to a second frame. In this example, each bounding polygon covers a portion of the animation timeline, and, as described above, the animation timeline corresponds to a movement of the one or more primitives. In some examples, CPU 6 may determine the plurality of bounding polygons and output information of the bounding polygons to GPU 8. In such examples, GPU 8 may determine the plurality of bounding polygons that together cover an animation timeline one or more primitives from a first frame to a second frame based on the received information.

GPU 8 may determine temporal values for samples within each of the bounding polygons based on a sampling pattern (e.g., based on a stochastic sampling pattern stored in a stencil buffer). In some examples, prior to samples of respective bounding polygons being processed by the pixel shader stage of the graphics pipeline of GPU 8, GPU 8 may determine, via a stencil test, which samples within respective bounding polygons are to be further processed based on temporal values for the samples within respective bounding polygons and respective different threshold conditions for each of the respective bounding polygons. For instance, each bounding polygon may be associated with a different threshold condition, and the threshold condition may be based the number of bounding polygons in the plurality of bounding polygons. The threshold condition for a bounding polygon may be based on the time instance that the bounding polygon covers.

As described in more detail, by applying a stencil test that is specific to a particular bounding polygon, GPU 8 may discard samples whose temporal values are outside the time instance that the bounding polygon covers. In this way, instantiations of the pixel shader are executed only for samples having temporal values within the time instance covered by the bounding polygon, which reduces the number of unnecessary executions of the pixel shader. It might be possible that there are still some executions of the pixel shader for which the pixel shader determines that the sample is not be further processed, but the chances of such a result are reduced.

Accordingly, GPU 8 may discard from further processing a first set of the samples within a bounding polygon of the plurality of bounding polygons and maintain a second set of the samples within the bounding polygon of the plurality of bounding polygons based on the determination, from a threshold condition for that bounding polygon, of which samples within the bounding polygon are to be further processed. GPU 8 may then execute one or more instances of a pixel shader to process the second set of samples of the bounding polygon.

Figure 5:
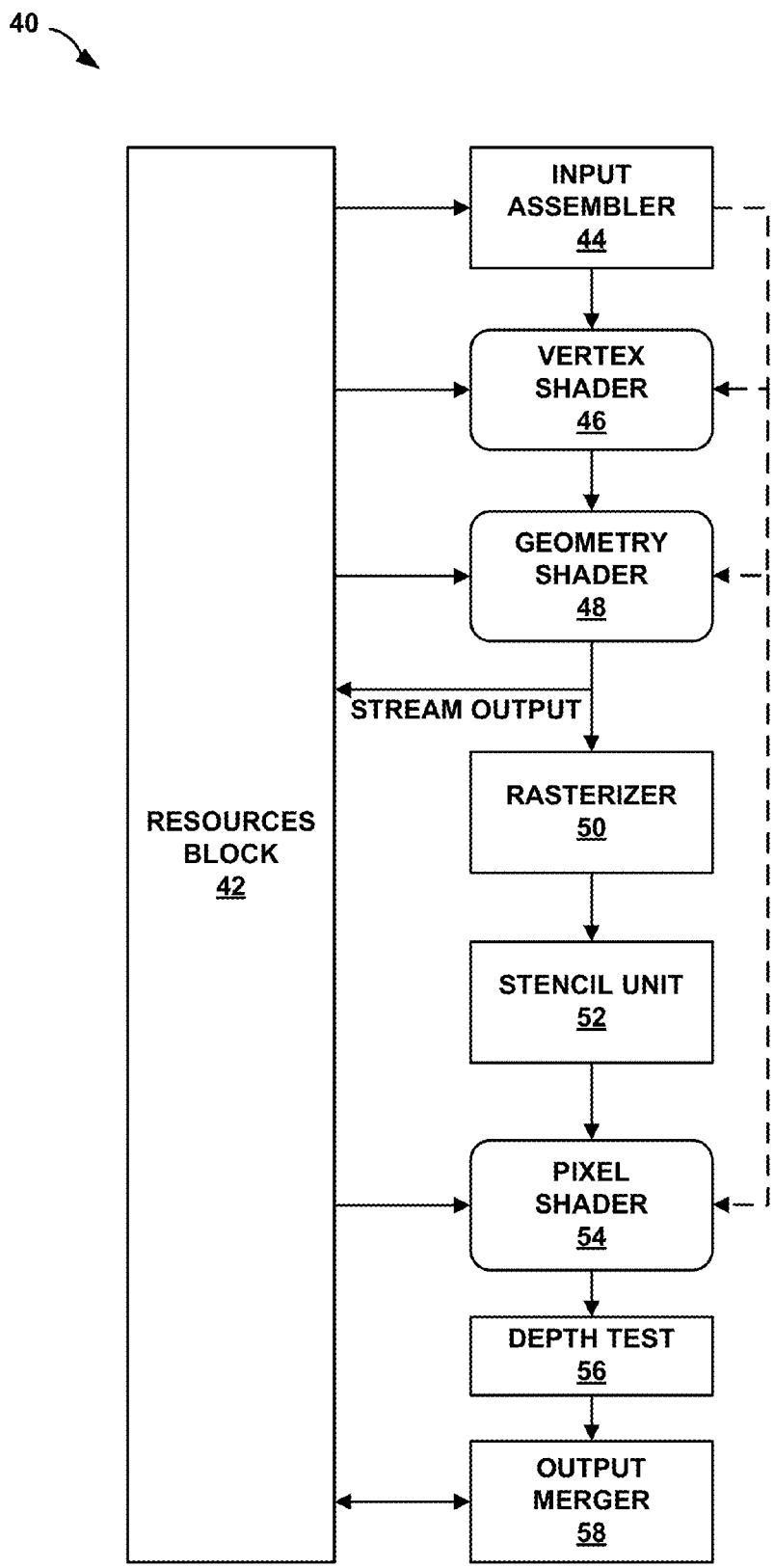
FIG. 5 is a conceptual diagram illustrating an example graphics pipeline that may be implemented by the GPU in FIG. 1 to perform all or part of the stochastic rasterization techniques of this disclosure.

FIG. 5 is a conceptual diagram illustrating an example graphics pipeline 40 that may be implemented by GPU 8 in FIG. 1 to perform all or part of the stochastic rasterization techniques of this disclosure. In some examples, graphics pipeline 40 may correspond to a Microsoft® DirectX (DX) 10 graphics pipeline. In further examples, graphics pipeline 40 may correspond to a Microsoft® DX 11 graphics pipeline with on-chip tessellation disabled.

Although example graphics pipeline 40 is illustrated in FIG. 5 as not including on-chip tessellation stages, in other examples, a graphics pipeline that include on-chip tessellation stages may be used to implement the stochastic rasterization techniques of this disclosure. Other graphics pipeline that include the same or different components in the same or different configuration may also be used to implement the stochastic rasterization techniques of this disclosure.

Graphics pipeline 40 is configured to render one or more graphics primitives into a render target. Graphics pipeline 40 includes a resources block 42, an input assembler 44, a vertex shader 46, a geometry shader 48, a rasterizer 50, a stencil unit 52, a pixel shader 54, a depth test unit 56, and an output merger 58.

Resources block 42 may correspond to one or more memory resources used by pipeline stages in graphics pipeline 40, such as, e.g., one or more textures and/or one or more buffers (e.g., vertex buffers, frame buffers, stencil buffers etc.). For example, a memory unit (e.g., a stencil buffer) may be configured to store values of a sampling pattern (e.g., a stochastic sampling pattern) from which rasterizer 50 may determine the temporal values of a bounding polygon. This memory unit (e.g., stencil buffer) may be within local memory of GPU 8, within memory 12, or some combination of storage between the local memory and memory 12.

Moreover, resources block 42 may also correspond to units of GPU 8 that control the functionality of various components. For example, resources block 22 may correspond to a control unit, a scheduler, and other such types of units used to perform the graphics processing of GPU 8.

The processing stages depicted in FIG. 5 with straight corners represent fixed-function processing stages, and the processing stages depicted in FIG. 5 with rounded corners represent programmable processing stages. For example, as shown in FIG. 5, input assembler 44, rasterizer 50, depth test unit 56, and output merger 58 are fixed-function processing stages, and vertex shader 46, geometry shader 48, and pixel shader 54 are programmable processing stages.

A programmable processing stage may refer to a processing stage that is configured to execute a program (e.g., a shader program) that is defined by, compiled by, and/or loaded onto a GPU that implements graphics pipeline 40 by a host device (e.g., CPU 6) that uses the GPU. In some cases, the program may be defined by a user-level graphics application executing on a host device and loaded onto the GPU by a GPU driver executing on the host device. A fixed-function processing stage may include hardware that is not configured to receive and execute programs from a host device. The hardware included in a fixed-function processing stage may be hard-wired to perform certain functions. Although the hardware included in a fixed-function processing stage may be configurable, the configurability of the hardware is based on one or more control signals as opposed to being based on a program (e.g., a shader program).

Each of the programmable stages shown in graphics pipeline 40 may be configured to execute a shader program of a particular type. For example, vertex shader 46 may be configured to execute a vertex shader program, geometry shader 48 may be configured to execute a geometry shader program, and pixel shader 54 may be configured to execute a pixel shader program.

A GPU that implements graphics pipeline 40 may include one or more shader units that are configured to execute the different types of shader programs. Each of the different types of shader programs may execute on a common shader unit of a GPU that implements graphics pipeline 40 and/or on one or more dedicated shader units that are dedicated to executing shader programs of one or more particular types.

Graphics pipeline 40 begins rendering a set of primitives in response to receiving a draw call command and data indicative of one or more primitives to be rendered. The data indicative of the primitives to be rendered may include, for example, one or more vertex buffers, one or more index buffers, and/or one or more state configurations indicative of the type of primitive to be rendered. The vertex buffers and/or index buffers may, in some examples, be stored in resources block 42.

Input assembler 44 may retrieve one or more vertices from resources block 42, form geometry (e.g., primitives) based on the vertices, and issue the vertices to vertex shader 46 for further processing. Input assembler 44 may also generate one or more system generated values for each of the vertices and supply the system generated values to vertex shader 46 and/or geometry shader 48. For example, input assembler 44 may generate vertex identification values that uniquely identify each of the vertices in a particular draw call and supply the vertex identification values to vertex shader 46 and/or geometry shader 48. As another example, input assembler 44 may generate primitive identification values that uniquely identify each of the primitives in a particular draw call, and supply the primitive identification values to geometry shader 48.

Vertex shader 46 may generate output vertices based on the vertices received from input assembler 44 and based on a vertex shader program. From a programming perspective, in order to generate the output vertices, vertex shader 46 may execute a respective instance of the vertex shader program for each of the vertices that are received from input assembler 44. In some examples, the vertex shader program may perform per-vertex processing on the input vertices to generate the output vertices. Per-vertex processing may refer to processing that is performed independently for each of the vertices that are processed. Per-vertex processing may include, for example, performing vertex transformations, performing lighting operations, performing fog operations, performing vertex shading, etc.

Geometry shader 48 may generate output primitives based on input primitives that are received by geometry shader 48 and based on a geometry shader program. The input primitives that are received by geometry shader 48 may be formed based the output vertices that are generated by vertex shader 46. From a programming perspective, in order to generate the output primitives, geometry shader 48 may execute a respective instance of the geometry shader program for each of the primitives that are received by geometry shader 48. In some examples, the geometry shader program may perform per-primitive processing on the input primitives to generate the output primitives. Per-primitive processing may refer to processing that is performed independently for each of the primitives that are processed. Per-primitive processing may include, for example, adding or deleting vertices, adding or deleting the number of primitives that are output by geometry shader 48 for each input primitive, etc.

Rasterizer 50 may generate source pixels (or source samples) based on the primitives received from geometry shader 48. For example, for each of the primitives received from geometry shader 48, rasterizer 50 may rasterize the primitive to generate a plurality of source pixels that correspond to the primitive. Rasterizing a primitive may involve, for example, performing scan conversion on the primitive to determine which pixels correspond to the primitive and/or interpolating attributes for the pixels that correspond to a primitive based on the attributes of the vertices of the primitive.

Stencil unit 52 may receive the output from rasterizer 50 and perform a stencil test on the outputted samples. As describe in more detail, in the techniques described in this disclosure, stencil unit 52 may discard one or more samples outputted by rasterizer 50 that fail the stencil test and maintain the samples outputted by rasterizer 50 that pass the stencil test.

Pixel shader 54 may generate output source pixels based on input source pixels received from stencil unit 52 and based on a pixel shader program. By discarding samples prior to the pixel shader stage of GPU 8 that includes pixel shader 54, the number of instances of execution of pixel shader 54 may be reduced. From a programming perspective, in order to generate the output source pixels, pixel shader 54 may execute a respective instance of the pixel shader program for each of the pixels that are received from stencil unit 52. In some examples, the pixel shader program may perform per-pixel processing on the input source pixels to generate the output source pixels. Per-pixel processing may refer to processing that is performed independently for each of the pixels that are processed. Per-pixel processing may include, for example, performing pixel shading, performing texture mapping, etc.

Depth test unit 56 receives the output from pixel shader 54 and determines which pixels are occluded. Depth test unit 56 culls out the occluded pixels, and output the visible pixels to output merger 58.

Output merger 58 may generate destination pixels based on the source pixels received from depth test unit 56. In some examples, output merger 58 may merge each of the source pixels received from depth test unit 56 with a corresponding destination pixel stored in a render target to generate an updated version of the corresponding destination pixel. A destination pixel may correspond to a source pixel if the destination pixel has the same pixel location in the render target as the pixel location of the source pixel. To merge the source pixels with destination pixels, output merger 58 may perform one or more of a blending operation, a compositing operation, and a raster operation with respect to the source and destination pixels to be merged.

The resulting destination pixels are stored in a render target, which in some examples, may be a frame buffer. The render target may form part of resources block 42. The data stored in the render target may correspond to a rasterized, composited version of the primitives received by graphics pipeline 40.

In some examples, graphics pipeline may implement all or a part of the stochastic rasterization described in this disclosure. For example, rasterizer 50 may include a stencil test block that is configured to perform any of the stencil tests described in this disclosure. As another example, a stencil test block may be located between rasterizer 50 and pixel shader 54 (e.g., stencil unit 52 illustrated in FIG. 5) in graphics pipeline 40 that is configured to perform any of the stencil tests described in this disclosure. For ease of description, the techniques are described with respect to stencil unit 52 performing functions of the stencil test, but such techniques may be part of rasterizer 50.

For example, rasterizer 50 and/or a stencil test block (e.g., stencil unit 52) may be configured to selectively discard samples from graphics pipeline 40 of GPU 8 prior to the samples arriving at a pixel shader stage (e.g., pixel shader 54) of the pixel processing pipeline based on values stored in a stencil buffer (e.g., stencil mask). The values stored in the stencil buffer may be determined based on a stochastic sampling pattern. As described above, by selectively discarding samples prior to the pixel shader stage of the pixel processing pipeline, the number of samples processed by the pixel shader stage may be reduced, thereby avoiding a large number of unnecessary invocations of pixel shader 54. In this way, the performance of GPU 8 when performing stochastic rasterization may be improved.

In some examples, one or more programmable processing stages of graphics pipeline 40 (e.g., geometry shader 48) may perform one or more aspects of this disclosure. For example, geometry shader 48 may generate bounding polygons for primitives and/or clusters of primitives. As another example, geometry shader 48 may partition a bounding polygon into a plurality of bounding polygon partitions, and determine time intervals for each of the bounding polygon partitions. As a further example, geometry shader 48 may subdivide a timeline into a plurality of segmented time intervals. In additional examples, geometry shader 48 may provide primitive-specific reference values to a stencil test block in rasterizer 50 or to a stencil test block in another portion of graphics pipeline 40 for use in performing a stencil test.

FIGS. 6A-6C are a conceptual diagrams illustrating an example manner in which to generate bounding polygons in accordance with techniques described in this disclosure. To assist with understanding, FIGS. 6A-6C are described with respect to graphics pipeline 40. FIG. 6A illustrates a single bounding polygon, similar to bounding polygon 20 of FIG. 2. In addition, FIG. 6A illustrates an example of a stochastic sampling pattern (identified as t pattern in fragment shader). In this way, FIG. 6A illustrates a conventional way of stochastic rasterization in which pixel shader 54 (also referred to as fragment shader 54) is invoked for each sample in the bounding polygon.

However, in the techniques described in this disclosure, rather than utilizing a single bounding polygon, geometry shader 48 may determine a plurality of bounding polygons that together cover an animation timeline of one or more primitives from a first frame to a second frame. In these examples, each bounding polygon covers a portion of the animation timeline, and the animation timeline corresponds to a movement of the one or more primitives.

For example, FIG. 6A illustrates a single bounding polygon that covers the entire animation timeline of the illustrated triangle from a first frame (represented by the triangle on the left end) to a second frame (represented by the triangle on the right end). FIGS. 6B and 6C together illustrate a plurality of bounding polygons that together cover the animation timeline illustrated in FIG. 6A. For instance, FIG. 6B illustrates one bounding polygon that covers a portion of the animation timeline (e.g., the first half of the animation timeline), and FIG. 6C illustrates another bounding polygon that covers a another portion of the animation timeline (e.g., the second half of the animation timeline).

In some examples, geometry shader 48 may determine the bounding polygons illustrated in FIGS. 6B and 6C based on information received from CPU 6. Also, geometry shader 48 is described as determining the plurality of bounding polygons because geometry shader 48 outputs to rasterizer 50. However, in examples where geometry shader 48 does not exist, some upstream shader (e.g., vertex shader) may be configured to determine the plurality of bounding polygons. It may even be possible for some other shader to determine the plurality of bounding polygons even in examples where geometry shader 48 forms part of graphics pipeline 40.

Rasterizer 50 may be configured to determine temporal values for samples within each of the bounding polygons (e.g., bounding polygons illustrated in FIGS. 6B and 6C) based on a sampling pattern. For instance, a control unit (e.g., a unit that forms part of resources block 42) may be configured to load a stochastic sampling pattern into a stencil buffer, and repeat the sampling pattern across the stencil buffer. As an example, the control unit may load the stochastic sampling pattern illustrated in FIG. 6A, and repeat the stochastic sampling pattern across the stencil buffer.

The size of the stencil buffer may equal the size of the frame to be displayed, and the stochastic sampling pattern may be a relatively small tile that is smaller than the size of the frame to be displayed (e.g., 8×8 as illustrated in FIG. 6A). Accordingly, to fill the stencil buffer, the control unit may repeat the stochastic pattern until the stencil buffer is full. In general, GPU 8 may load a stochastic sampling pattern, and determine values of a stencil buffer based on the stochastic sampling pattern. One way in which GPU 8 may determine values of the stencil buffer is by repeating the stochastic sampling pattern. There may be other ways in which GPU 8 may determine values of the stencil buffer based on the stochastic sampling pattern, and repeating the stochastic sampling pattern is provided merely as one example way.

Rasterizer 50 may determine the temporal values of each sample in bounding polygons based on the values stored in the stencil buffer. For example, each storage location in the stencil buffer corresponds to a location in the frame (e.g., storage location (1, 1) in the stencil buffer corresponds to location (1, 1) in the frame). Based on a location of a sample in the bounding polygon, rasterizer 50 may be able to determine its value based on the corresponding location in the stencil buffer. In other words, a temporal value of a sample equals a value in a storage location of the stencil buffer that corresponds to a location of the sample in the bounding polygon.

In accordance with example techniques described in this disclosure, prior to samples of respective bounding polygons being processed by pixel shader 54, stencil unit 52 may determine which samples within respective bounding polygons are to be further processed based on temporal values for the samples within respective bounding polygons and respective different threshold conditions for each of the respective bounding polygons. For example, stencil unit 52 may receive threshold conditions for each of the bounding polygons and based on the threshold condition determines which samples should be further processed.

FIG. 6B illustrates a first bounding polygon that covers the first half of the animation timeline (e.g., from 0 to 0.5). This means that only samples having temporal value less than or equal to 0.5 can possibly be rendered in the first bounding polygon. However, it may be possible that there are samples within the first bounding polygon that have temporal values greater than 0.5 (e.g., due to the randomness of the stochastic sampling pattern). Accordingly, one threshold condition may be that only samples having temporal values less than or equal to 0.5 should be maintained in the first bounding polygon, and samples having temporal values greater than 0.5 should be discarded from the first bounding polygon.

Stencil unit 52 may determine which samples of the first bounding polygon are to further processed by comparing the temporal values within the first bounding polygon (e.g., as determined from the stencil buffer) to a first threshold condition (e.g., temporal values less than or equal to 0.5). For example, stencil unit 52 may perform a stencil test to compare values in the stencil buffer that correspond to the first bounding polygon to the threshold condition for the first bounding polygon, and determine which samples within the first bounding polygon are to be further processed based on the stencil test.

In FIG. 6B, stencil unit 52 may discard a first set of samples from the first bounding polygon, and maintain a second set of samples from the first bounding polygon based on the determination of which samples are to be further processed. For example, stencil unit 52 may discard a first set of samples of the first bounding polygon having a temporal value greater than 0.5, and maintain for further processing a second set of samples of the first bounding polygon having a temporal value less than or equal to 0.5.

One or more instances of pixel shader 54 may execute to process the second set of samples in the first bounding polygon (e.g., to add motion blur). For example, pixel shader 54 may determine which samples of the second set of samples of the first bounding polygon are to be shaded based on if sample is inside of primitive at the temporal position. Pixel shader 54 may shade one or more samples of the second set of samples in the first bounding polygon based on the determination (e.g., determine color values for the one or more samples). For example, pixel shader 54 may apply bilinear interpolation to determine relative coordinates of a sample within the primitive at the temporal position, and determine color values or texture for the sample based on the determined coordinates to shade the sample (e.g., determine color). There may be various ways in which to pixel shader 54 may shade a particular sample, and the techniques described in this disclosure are not limited to any particular example.

It should be understood that it is possible, although the chances are drastically reduced, that there may still be some unnecessary invocations of pixel shader 54. For example, for a sample having a temporal value of 0.2, pixel shader 54 would execute for such as sample as it would have passed the stencil test. However, if this sample is not located in a time instance corresponding to 0.2 in the first bounding polygon, the sample will be discarded. Accordingly, even though there may be some extra execution of pixel shader 54, because many samples are discarded prior to pixel shader 54, the extraneous invocations of pixel shader 54 may be reduced.

Similarly, FIG. 6C illustrates a second bounding polygon that covers the second half of the animation timeline (e.g., from 0.5 to 1). This means that only samples having temporal value greater than 0.5 can possibly be rendered in the second bounding polygon. However, it may be possible that there are samples within the second bounding polygon that have temporal values less than or equal to 0.5 (e.g., due to the randomness of the stochastic sampling pattern). Accordingly, a second, different threshold condition (i.e., different than the threshold condition for the first bounding polygon) may be that only samples having temporal values greater than 0.5 should be maintained in the second bounding polygon, and samples having temporal values less than or equal to 0.5 should be discarded from the second bounding polygon.

As with the first bounding polygon, stencil unit 52 may determine which samples of the second bounding polygon are to further processed by comparing the temporal values within the second bounding polygon (e.g., as determined from the stencil buffer) to a second threshold condition (e.g., temporal values greater than 0.5). For example, stencil unit 52 may perform a stencil test to compare values in the stencil buffer that correspond to the second bounding polygon to the threshold condition for the second bounding polygon, and determine which samples within the second bounding polygon are to be further processed based on the stencil test.

In FIG. 6C, stencil unit 52 may discard a first set of samples from the second bounding polygon, and maintain a second set of samples from the second bounding polygon based on the determination of which samples are to be further processed. For example, stencil unit 52 may discard a first set of samples of the second bounding polygon having a temporal value less than or equal to 0.5, and maintain for further processing a second set of samples of the second bounding polygon having a temporal value greater than 0.5.

Similar to above, one or more instances of pixel shader 54 may execute to process the second set of samples in the second bounding polygon (e.g., to add motion blur). For example, pixel shader 54 may determine which samples of the second set of samples of the second bounding polygon are to be shaded based on a location of the second set of samples within the second bounding polygon. Pixel shader 54 may shade one or more samples of the second set of samples in the second bounding polygon based on the determination (e.g., determine color values for the one or more samples).

Again, it should be understood that it is possible, although the chances are drastically reduced, that there may still be some unnecessary invocations of pixel shader 54. For example, for a sample having a temporal value of 0.8, pixel shader 54 would execute for such as sample as it would have passed the stencil test. However, if this sample is not located in a time instance corresponding to 0.8 in the second bounding polygon, the sample will be discarded. Accordingly, even though there may be some extra execution of pixel shader 54, because many samples are discarded prior to pixel shader 54, the extraneous invocations of pixel shader 54 may be reduced.

In this example, the animation timeline is broken in halves, with there being two bounding polygons. Stencil unit 52 may run stochastic sampling for each bounding polygon with corresponding stencil settings. One stencil setting may be the first threshold condition for the first bounding polygon (e.g., less than or equal to 0.5), and another stencil setting may be the second threshold condition for the second bounding polygon (e.g., greater than 0.5). Due to the random, but even, distribution of the temporal values, approximately half of the samples may be discarded by stencil unit 52 before reaching pixel shader 54, thereby almost doubling the rate of valid samples (i.e., samples that are further processed).

In the above example, the single bounding polygon was divided into two. However, the techniques described in this disclosure are not so limited. In some examples, for long bounding polygon, geometry shader 48 may determine more segments of the single bounding polygon (e.g., more than two bounding polygons). For these multiple bounding polygons, each may have a different threshold condition. For instance, if there are ten bounding polygons, then the threshold condition for the first bounding polygon may be $0 \leq$ temporal value $\leq 0.1$, for the second bounding polygon $0.1 \leq$ temporal value $\leq 0.2$, and so forth until $0.9 \leq$ temporal value $\leq 1$. In general, the different threshold conditions may be based on the time instances covered by a bounding polygon. For instance, the first bounding polygon covers the time instances from 0 to 0.1, and therefore, the first threshold condition is $0 \leq$ temporal value $\leq 0.1$, the second bounding polygon covers the time instances from 0.1 to 0.2, and therefore, the second threshold condition is $0.1 \leq$ temporal value $\leq 0.2$, and so forth.

Having more segments may provide even better rate of valid samples. In some examples, whether a bounding polygon is considered long or not may be based on the size of the static primitive. In other words, the number of segments that a bounding polygon is divided into (e.g., the number of bounding polygons in the plurality of bounding polygons) may be based on the size of the one or more primitives and the velocity the primitives have.

In some examples, stencil unit 52 and the stencil buffer may be specialized to implement the techniques described in this disclosure. For instance, stencil unit 52 and the stencil buffer may be configured to have different threshold conditions (also referred to as a reference value(s)) for different bounding polygons, where in some examples, the different threshold conditions are determined by geometry shader 48 and outputted to stencil unit 52. To achieve this, geometry shader 48 may utilize gl_StencilRefVal1, gl_StencilRefVal2, as two API extensions for enhanced stencil operation, to define a threshold condition (e.g., for condition $0 \leq$ temporal value $\leq 0.5$, 0 is StencilRefVal1 and 0.5 is StencilRefVal2). The stencil comparison mode may still be global. In this way, in performing the stencil test to compare values in the stencil buffer that correspond to the bounding polygon of the plurality of bounding polygons to the threshold condition for that bounding polygon, stencil unit 52 may determine whether values in the stencil buffer that correspond to the bounding polygon are greater than a first threshold value (e.g., 0) and less than a second threshold value (e.g., 0.5).

Moreover, as described above, the stochastic sampling pattern may be a small tile (e.g., 8×8 or 32×32). Therefore, only small stencil tile may be needed, but the stencil buffer would need to be filled with values. This may be achieved by repeating the stencil tile, but other ways may be possible.

Furthermore, as described above, the techniques described in this disclosure leverage a stencil test performed by stencil unit 52 to discard samples of the bounding polygon. In some graphics pipelines, a depth test and the stencil test are performed together on samples (such as where there is an early z test and a late depth test). However, because the stencil test is being utilized for discarding samples from a bounding polygon, the late depth test may need to be separated from the stencil test. Accordingly, FIG. 5 illustrates depth test unit 56 after pixel shader 54. For example, depth test unit 56 may perform a depth test separate from performing stencil unit 52 performing the stencil test and may perform the depth test after the execution of the one or more instances of pixel shader 54. For instance, depth test unit 56 functions after pixel shader 54 because pixel shader 54 may modify depth values.

The following describes some example ways in which to implement example techniques described in this disclosure. It should be understood that these implementation examples are provided merely to assist with understanding and should not be considered as limiting.

FIGS. 7A-7C are conceptual diagrams illustrating a manner in which to timeline segment movement of a primitive. In the above examples, a straightforward movement was described (e.g., rightward movement of a primitive). However, most movement may not be linear. For instance, even simple rotation is non-linear. In some examples, timeline segmentation may reduce the mathematical complexity in addition to providing a way to discard samples prior to pixel shader 54. For example, geometry shader 48 may (either directly or based on information from CPU 6) timeline segment the animation timeline into a plurality of timeline segments, where the plurality of timeline segments form the animation timeline. In such examples, geometry shader 48 may determine the plurality of bounding polygons based on the plurality of timeline segments.

For example, in FIG. 7A, only one interval is illustrated. In FIG. 7B, two intervals are illustrated, allowing for two bounding polygons. In FIG. 7C, four intervals are illustrated, allowing for four bounding polygons.

In some examples, the movement of the primitive may appear as if it coming towards the viewer or away from the viewer. One way for the viewer to perceive the movement of the primitive towards or away from is to increase or decrease the size of the primitive because of perspective projection.

FIG. 8 is a conceptual diagram illustrating an example of a movement of a primitive towards a viewer. In FIG. 8, the primitive becomes larger in size going from frame to frame, which adds another dimension to the bounding polygon, but the concepts generally hold the same. Also, the projection of the primitive getting larger (the same would true for smaller) may cause non-linear accelerations even for linear motion in the object space. By timeline segmentations, GPU 8 may avoid projection calculation for each sample, and stenciled rasterization can be used on those.

FIG. 9 is a conceptual diagram illustrating an example of segmenting bounding polygon into spatially non-overlapping a plurality of polygons. In this example, the animation timeline is illustrated as being segmented into thirds. However this spatially non-overlapping segmentation on bounding polygon may cause corresponding temporal overlapping on animation timeline. In this example, the primitive changes the orientation and size in addition to moving.

For example, geometry shader 48 may determine a first bounding box that extends from 0 to 0.35. Geometry shader 48 may also determine a second bounding box that extends from 0.30 to 0.70. Accordingly, the first bounding box and the second bounding box may overlap in time. Geometry shader 48 may similarly determine the third bounding box from 0.65 to 1.

Geometry shader 48 determines range of time instances for each bounding polygon segment, using a bounding box intersection algorithm. For example, FIG. 10A is a conceptual diagram illustrating a bounding polygon segment and corresponding bounding box. FIG. 10B demonstrates the intersection of dynamic bounding box of primitive at time instance t0 and t1 with bounding box of original bounding polygon segment in FIG. 10A.

Figure 11:
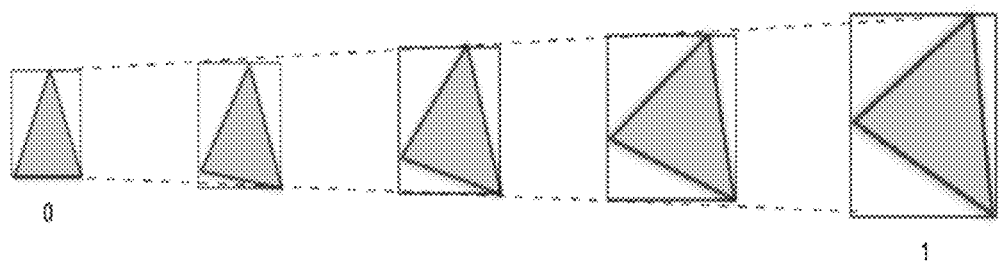
FIG. 11 is a conceptual diagram illustrating the movement of a primitive.

As indicated in the example of FIG. 10B, the orientation of the primitive changes as it moves, this in turn may cause the bounding polygon to alter in linear motion as well. For example, FIG. 11 is a conceptual diagram illustrating the movement of a primitive. In FIG. 11, dynamic bounding box that covers a time instance of each of a plurality of time instances of the primitive is illustrated.

Geometry shader 48 may utilize the linear motion of the primitive to determine the bounding box at any time instance along the animation timeline (e.g., to determine the bounding box for each time instance illustrated in FIG. 11). For example, let the time instance be defined by variable "t," where t is between 0 and 1. Each bounding box that covers a primitive at time instance t is given by a minimum and maximum x value and a minimum and maximum y value. The minimum and maximum x and y values for any given time instance t is based on the velocity and/or rotation of the primitive.

In general, the linear motion of the primitive may lead to the linear motion of dynamic bounding box that covers the primitive to change (e.g., the size and location of the bounding box may change). The equation for the minimum and maximum coordinates of dynamic bounding box for a given time instance t may be given as: $x_{max}=a_0*t+b_0$, $x_{min}=a_1*t+b_1$, $y_{max}=a_2*t+b_2$, and $y_{min}=a_3*t+b_3$. In this example, $a_0$, $b_0$, $a_1$, $b_1$, $a_2$, $b_2$, $a_3$, and $b_3$ are all constant parameter values calculated based on the velocity of each vertex of the primitive, where the velocity information is provided by the application executing on CPU 6. Accordingly, with the above example, geometry shader 48 may determine size and location of dynamic bounding box that covers each time instance of a primitive.

In this way, the dynamic bounding box may be conservative even when vertices have different velocities. In other words, if the vertices of the primitive have different velocities, than the primitive may change in size and/or orientation. However, even for such a case, the dynamic bounding box may cover the minimum area needed to encompass the time instance of the primitive (e.g., the bounding box is conservative).

Figure 12:
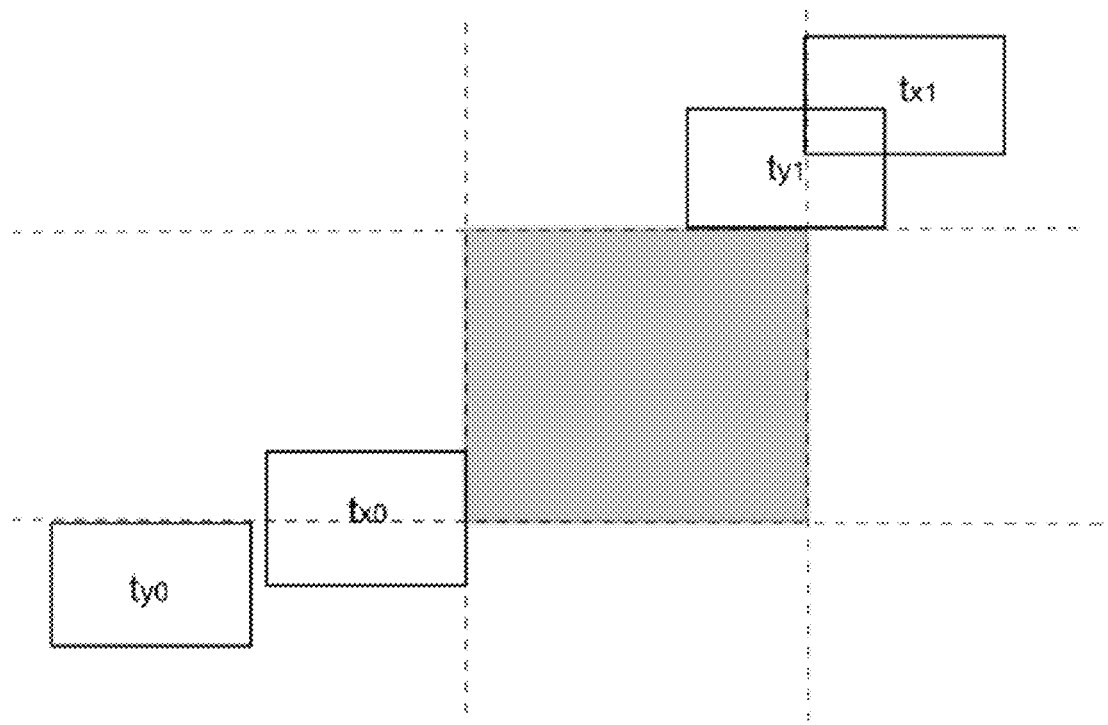
FIG. 12 is a conceptual diagram illustrating a way to determine bounding polygon intersections.

FIG. 12 is a conceptual diagram illustrating a way to determine bounding polygon intersections. The shaded box in the middle illustrates bounding box of original bounding polygon segment, and unshaded boxes are instances of dynamic bounding box of primitive. Geometry shader 48 may determine range of time instances that dynamic bounding box of primitive intersects with bounding box of original bounding polygon segment. For this, geometry shader 48 may calculate time intervals $(t_{x0}, t_{x1})$ that the dynamic bounding box intersects with bounding box of original bounding polygon segment at x direction, and $(t_{y0}, t_{y1})$ that they intersect at y directions. And geometry shader 48 may determine $(t_{x0}, t_{x1}) \cap (t_{y0}, t_{y1})$ for intersection on both x, y directions and clamp the result to [0,1], and take the final result as range of time instances of original bounding polygon segment. For example in FIG. 9, the temporal range for three bounding polygon segments are [0.0, 0.35], [0.30, 0.70], [0.65, 1.0]. The resulting range of time instances on which the stencil test is applied to implement example techniques described in this disclosure.

In the above examples, GPU 8 is described as determining bounding polygons for one primitive. However, the techniques described in this disclosure are not so limited. For example, geometry shader 48 may determine a bounding polygon for a cluster of primitives. In this way, geometry shader 48 may use a cluster of primitives to avoid overlapping of too many bounding polygons for each of primitives.

For example, as described above with respect to FIG. 4, for neighboring primitives there may be multiple overlapping bounding polygons (one for each primitive) especially if the primitives moved along generally the same animation timeline.

Figure 13A:
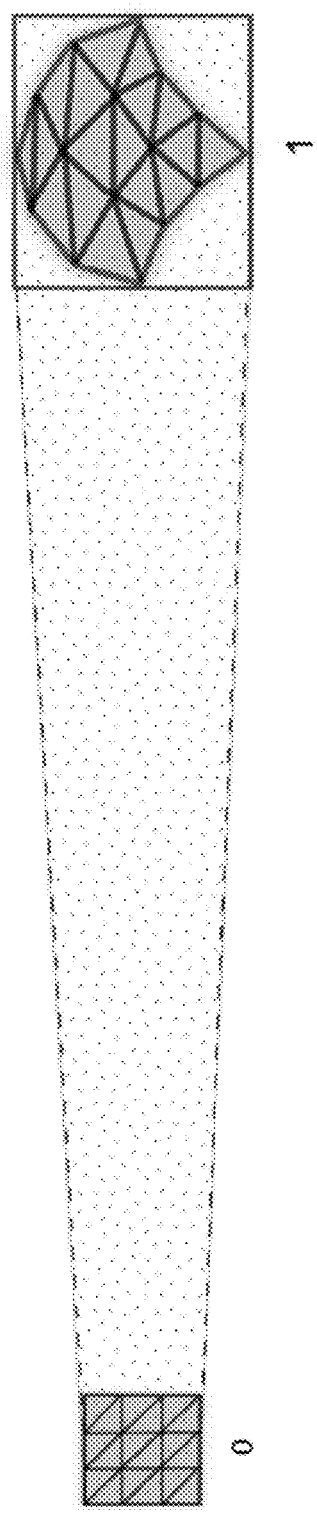
FIGS. 13A and 13B are conceptual diagrams illustrating time instances of a cluster of primitives.
Figure 13B:
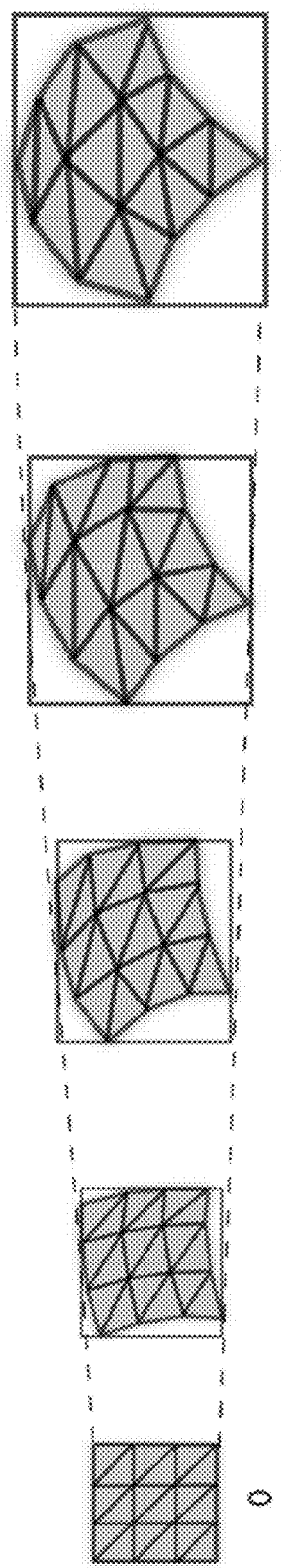

FIGS. 13A and 13B are conceptual diagrams illustrating time instances of a cluster of primitives. For example, FIG. 13A illustrates an example of movement of a cluster of primitives. Geometry shader 48 determines a bounding polygon that covers the cluster of primitives and the movement of the cluster of primitives. For a cluster of primitives, when executed, pixel shader 54 may loop through each of the primitives in the cluster for ray casting test (e.g., determine the relative coordinates of that sample within the temporal position of the primitive using bilinear interpolation, as one example). In FIG. 13B, the cluster of primitives is illustrated at different time instances. For instance, the size of the bounding polygon may change based on the changes in the size and orientation of the cluster of primitives. In some examples, geometry shader 48 may determine a plurality of bounding polygons where two bounding polygons overlap over at least some of the time instances. In some examples, geometry shader 48 may determine a plurality of bounding polygons based on segmenting a bounding polygon that covers the entire animation timeline based on time intervals.

Figure 14:
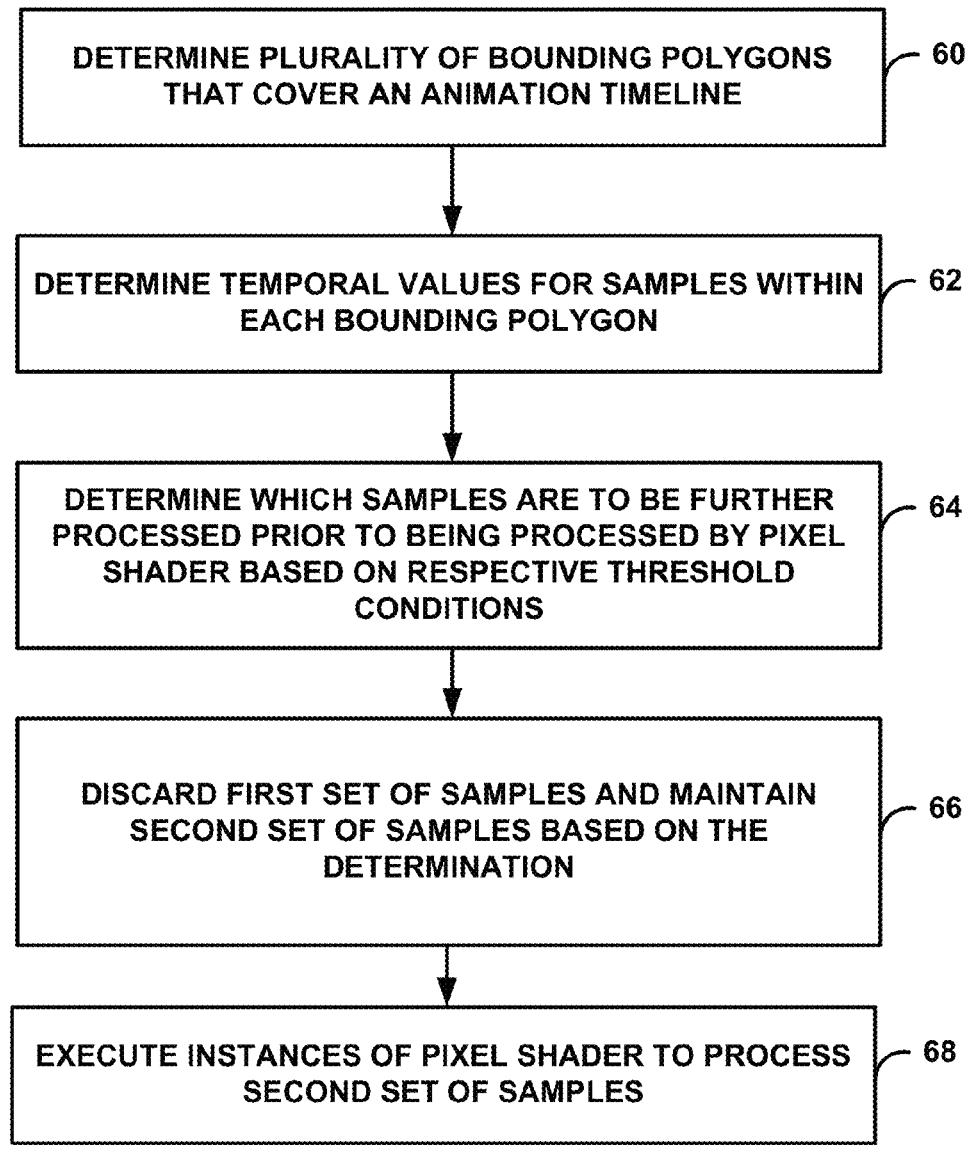
FIG. 14 is a flowchart illustrating an example method of graphics processing.

FIG. 14 is a flowchart illustrating an example method of graphics processing. For ease of illustration, the example of FIG. 14 is described with respect to graphics pipeline 40.

For example, a shader (e.g., geometry shader 48) of GPU 8 may determine a plurality of bounding polygons that together cover an animation timeline of one or more primitives from a first frame to a second frame (60). Each bounding polygon covers a portion of the animation timeline, and the animation timeline corresponds to a movement of the one or more primitives. The one or more primitives may be a single primitive, in some cases, or a cluster of primitives, in some cases.

In some examples, the shader may determine the plurality of bounding polygons based on information received from CPU 6. Also, in some examples, the shader may determine a single bounding polygon that covers the entire animation timeline, and segment the single bounding polygon to generate the plurality of bounding polygons, but portions of two bounding polygons may overlap. In some examples, the shader may segment the animation timeline into a plurality of timeline segments, where each of the timeline segments form the animation timeline. In these examples, the shader may determine the plurality of bounding polygons based on the plurality of timeline segments.

GPU 8, via rasterizer 50, may determine temporal values for samples within each of the bounding polygons based on a sampling pattern (62). For example, GPU 8 may load a stochastic sampling pattern, and determine values of a stencil buffer based on the stochastic sampling pattern. As one example, GPU 8 may repeat the stochastic sampling pattern in the stencil buffer until each storage location of the stencil buffer is stores a value. In the techniques described in this disclosure, a temporal value of a sample equals a value in a storage location of the stencil buffer that corresponds to a location of the sample in the bounding polygon. Based on this association of values in the stencil buffer to locations in the frame, rasterizer 50 may determine the temporal values for samples in each of the bounding polygons.

Prior to samples of respective bounding polygons being processed by pixel shader 54 of graphics pipeline 40 of GPU 8, stencil unit 52 may determine which samples within respective bounding polygons are to be further processed based on temporal values for the samples within respective bounding polygons and respective different threshold conditions for each of the respective bounding polygons (64). For example, stencil unit 52 may perform a stencil test to compare values in the stencil buffer that correspond to the bounding polygon of the plurality of bounding polygons to the threshold condition for that bounding polygon. Stencil unit 52 may determine which samples within the bounding polygon are to be further processed based on the stencil test. In some examples, to perform the stencil test, stencil unit 52 may determine whether values in the stencil buffer that correspond to the bounding polygon are greater than a first threshold value and less than a second threshold value.

Stencil unit 52 may discard from further processing a first set of the samples within a bounding polygon of the plurality of bounding polygons and maintain a second set of the samples within the bounding polygon of the plurality of bounding polygons based on the determination, from a threshold condition for that bounding polygon, of which samples within the bounding polygon are to be further processed (66).

GPU 8 may execute one or more instances of pixel shader 54 to process the second set of samples of the bounding polygon (68). In some examples, GPU 8 may also store the stochastic sampling pattern in a texture buffer (e.g., in addition to the stencil buffer). The one or more instances of pixel shader 54 may retrieve the temporal values for the second set of samples from the texture buffer to determine whether a time instance of the one or more primitives covers the samples. In this way, storage of the stochastic sampling pattern in the stencil buffer allows for a stencil test to discard samples that will not be further processed prior to execution of one or more instances of pixel shader 54, and storage of the stochastic sampling pattern in the texture buffer allows for pixel shader 54 for further processing of the samples.

The one or more instances of pixel shader 54 may execute to add motion blur to the second frame as part of stochastic rasterization so that the viewer perceives the object formed from the one or more primitives as moving smoothly, rather than hopping. In some examples, the executing of the one or more instances of pixel shader 54 may include determining which samples of the second set of samples are to be shaded based on a location of the second set of samples within the bounding polygon, and shading (e.g., determining color) one or more samples of the second set of samples based on the determination.

In some examples, the techniques of this disclosure provide one or more relatively fast stochastic rasterization algorithms that may use enhanced stencil operations on a GPU. Motion blur has received a lot of attention. Motion blur may be used for eliminating temporal aliasing (e.g., hopping) in animation.

Full sampling methods may either be too slow for real-time graphics. Stochastic sampling may be feasible on current graphics hardware, but performing stochastic rasterization is still expensive. For each primitive, the rate of valid samples is typically low, and there may be a large amount overlapping between bounding polygons of primitives. The low rate of valid samples and the overlapping may result in wasted computation in the fragment shader (e.g., pixel shader).

In some examples, the techniques of this disclosure may use an enhanced stencil operation in GPU hardware. In further examples, the techniques of this disclosure may implement a variety of software algorithms to speed up motion blur on small triangles.

According to a first example, a software algorithm may break a timeline into segments, and drop invalid samples in the rasterizer for each segment. According to a second example, a software algorithm may partition a bounding polygon, and calculate corresponding time intervals for the rasterizer to drop invalid samples. According to a third example, a software algorithm may group primitive into clusters and apply either first example algorithm or the second example algorithm with bounding boxes. In some examples, the techniques of this disclosure may provide one or more shader application programming interface (API) extensions to expose aspects of this disclosure to graphics programmers.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry such as discrete hardware that performs processing.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be stored, embodied or encoded in a computer-readable medium, such as a computer-readable storage medium that stores instructions. Instructions embedded or encoded in a computer-readable medium may cause one or more processors to perform the techniques described herein, e.g., when the instructions are executed by the one or more processors. In some examples, the computer-readable medium may be a non-transitory computer-readable storage medium. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable storage media that is tangible.

Computer-readable media may include computer-readable storage media, which corresponds to a tangible storage medium, such as those listed above. Computer-readable media may also comprise communication media including any medium that facilitates transfer of a computer program from one place to another, e.g., according to a communication protocol. In this manner, the phrase "computer-readable media" generally may correspond to (1) tangible computer-readable storage media which is non-transitory, and (2) a non-tangible computer-readable communication medium such as a transitory signal or carrier wave.

Various aspects and examples have been described. However, modifications can be made to the structure or techniques of this disclosure without departing from the scope of the following claims.

What is claimed is:

1. A method of graphics processing, the method comprising:
   determining a plurality of bounding polygons that together cover an animation timeline of one or more primitives from a first frame to a second frame, wherein each bounding polygon covers a portion of the animation timeline, and wherein the animation timeline corresponds to a movement of the one or more primitives;
   determining temporal values for samples within each of the bounding polygons based on a sampling pattern;
   prior to samples of respective bounding polygons being processed by a pixel shader of a graphics pipeline of a graphics processing unit (GPU), determining which samples within respective bounding polygons are to be further processed based on temporal values for the samples within respective bounding polygons and respective different threshold conditions for each of the respective bounding polygons;
   discarding from further processing a first set of the samples within a bounding polygon of the plurality of bounding polygons and maintaining a second set of the samples within the bounding polygon of the plurality of bounding polygons based on the determination, from a threshold condition for that bounding polygon, of which samples within the bounding polygon are to be further processed; and
   executing one or more instances of the pixel shader to process the second set of samples of the bounding polygon.

2. The method of claim 1,
   wherein determining which samples within respective bounding polygons are to be further processed comprises:
   prior to samples of a first bounding polygon of the plurality of bounding polygons being processed by the pixel shader stage, determining which samples within the first bounding polygon are to be further processed based on temporal values for the samples within the first bounding polygon and a first threshold condition for the first bounding polygon; and
   prior to samples of a second bounding polygon of the plurality of bounding polygons being processed by the pixel shader stage, determining which samples within the second bounding polygon are to be further processed based on temporal values for the samples within the second bounding polygon and a second threshold condition for the second bounding polygon, and wherein discarding from further processing comprises:
   discarding from further processing a first set of the samples within the first bounding polygon of the plurality of bounding polygons and maintaining a second set of the samples within the first bounding polygon of the plurality of bounding polygons based on the determination, from the first threshold condition for the first bounding polygon, of which samples within the first bounding polygon are to be further processed; and discarding from further processing a first set of the samples within the second bounding polygon of the plurality of bounding polygons and maintaining a second set of the samples within the second bounding polygon of the plurality of bounding polygons based on the determination, from the second threshold condition for the second bounding polygon, of which samples within the second bounding polygon are to be further processed.

3. The method of claim 1, wherein determining the plurality of bounding polygons comprises:
determining a single bounding polygon that covers the entire animation timeline; and
segmenting the single bounding polygon to generate the plurality of bounding polygons.

4. The method of claim 1,
wherein determining temporal values for samples within the bounding polygon based on the sampling pattern comprises:
loading a stochastic sampling pattern; and
determining values of a stencil buffer based on the stochastic sampling pattern,
wherein a temporal value of a sample equals a value in a storage location of the stencil buffer that corresponds to a location of the sample in the bounding polygon, and
wherein determining which samples within the respective bounding polygons are to be further processed comprises:
performing a stencil test, prior to executing one or more instances of the pixel shader, to compare values in the stencil buffer that correspond to the bounding polygon of the plurality of bounding polygons to the threshold condition for that bounding polygon; and
determining which samples within the bounding polygon are to be further processed based on the stencil test.

5. The method of claim 4, further comprising:
performing a depth test separate from performing the stencil test after the execution of the one or more instances of the pixel shader.

6. The method of claim 4, wherein performing the stencil test to compare values in the stencil buffer that correspond to the bounding polygon of the plurality of bounding polygons to the threshold condition for that bounding polygon comprises determining whether values in the stencil buffer that correspond to the bounding polygon are greater than a first threshold value and less than a second threshold value.

7. The method of claim 1, wherein executing the one or more instances of the pixel shader comprises:
determining which samples of the second set of samples are to be shaded based on a location of the second set of samples within the bounding polygon;
determining relative positions within a time instance of the one or more primitives that cover the second set of samples; and
shading one or more samples of the second set of samples based on the determination of the relative positions.

8. The method of claim 1, further comprising:
timeline segmenting the animation timeline into a plurality of timeline segments, wherein the plurality of timeline segments form the animation timeline,
wherein determining the plurality of bounding polygons comprises determining the plurality of bounding polygons based on the plurality of timeline segments.

9. The method of claim 1, wherein the one or more primitives includes a cluster of a plurality of primitives.

10. The method of claim 1, wherein executing one or more instances of the pixel shader to process the second set of samples of the bounding polygon comprises executing one or more instances of the pixel shader to add motion blur to the second frame as part of stochastic rasterization.

11. A device for graphics processing, the device comprising:
a memory unit configured to store a sampling pattern; and
a graphics processing unit (GPU) configured to:
determine a plurality of bounding polygons that together cover an animation timeline of one or more primitives from a first frame to a second frame, wherein each bounding polygon covers a portion of the animation timeline, and wherein the animation timeline corresponds to a movement of the one or more primitives;
determine temporal values for samples within each of the bounding polygons based on the stored sampling pattern;
prior to samples of respective bounding polygons being processed by a pixel shader of a graphics pipeline of GPU, determine which samples within respective bounding polygons are to be further processed based on temporal values for the samples within respective bounding polygons and respective different threshold conditions for each of the respective bounding polygons;
discard from further processing a first set of the samples within a bounding polygon of the plurality of bounding polygons and maintain a second set of the samples within the bounding polygon of the plurality of bounding polygons based on the determination, from a threshold condition for that bounding polygon, of which samples within the bounding polygon are to be further processed; and
execute one or more instances of the pixel shader to process the second set of samples of the bounding polygon.

12. The device of claim 11,
wherein to determine which samples within respective bounding polygons are to be further processed, the GPU is configured to:
prior to samples of a first bounding polygon of the plurality of bounding polygons being processed by the pixel shader stage, determine which samples within the first bounding polygon are to be further processed based on temporal values for the samples within the first bounding polygon and a first threshold condition for the first bounding polygon; and
prior to samples of a second bounding polygon of the plurality of bounding polygons being processed by the pixel shader stage, determine which samples within the second bounding polygon are to be further processed based on temporal values for the samples within the second bounding polygon and a second threshold condition for the second bounding polygon, and wherein to discard from further processing, the GPU is configured to:
discard from further processing a first set of the samples within the first bounding polygon of the plurality of bounding polygons and maintain a second set of the samples within the first bounding polygon of the plurality of bounding polygons based on the determination, from the first threshold condition for the first bounding polygon, of which samples within the first bounding polygon are to be further processed; and discard from further processing a first set of the samples within the second bounding polygon of the plurality of bounding polygons and maintain a second set of the samples within the second bounding polygon of the plurality of bounding polygons based on the determination, from the second threshold condition for the second bounding polygon, of which samples within the second bounding polygon are to be further processed.

13. The device of claim 11, wherein to determine the plurality of bounding polygons, the GPU is configured to:
   determine a single bounding polygon that covers the entire animation timeline; and
   segment the single bounding polygon to generate the plurality of bounding polygons.

14. The device of claim 11,
   wherein the sampling pattern comprises a stochastic sampling pattern,
   wherein the memory unit comprises a stencil buffer,
   wherein to determine temporal values for samples within the bounding polygon based on the sampling pattern, the GPU is configured to:
      load the stochastic sampling pattern into the stencil buffer; and
      determine values of the stencil buffer based on the stochastic sampling pattern,
      wherein a temporal value of a sample equals a value in a storage location of the stencil buffer that corresponds to a location of the sample in the bounding polygon, and
   wherein to determine which samples within the respective bounding polygons are to be further processed, the GPU is configured to:
      perform a stencil test, prior to executing one or more instances of the pixel shader, to compare values in the stencil buffer that correspond to the bounding polygon of the plurality of bounding polygons to the threshold condition for that bounding polygon; and
      determine which samples within the bounding polygon are to be further processed based on the stencil test.

15. The device of claim 14, wherein the GPU is configured to:
   perform a depth test separate from performing the stencil test after the execution of the one or more instances of the pixel shader.

16. The device of claim 14, wherein to perform the stencil test to compare values in the stencil buffer that correspond to the bounding polygon of the plurality of bounding polygons to the threshold condition for that bounding polygon, the GPU is configured to determine whether values in the stencil buffer that correspond to the bounding polygon are greater than a first threshold value and less than a second threshold value.

17. The device of claim 11, wherein to execute the one or more instances of the pixel shader, the GPU is configured to:
   determine which samples of the second set of samples are to be shaded based on a location of the second set of samples within the bounding polygon;
   determine relative positions within a time instance of the one or more primitives that cover the second set of samples; and
   shade one or more samples of the second set of samples based on the determination of the relative positions.

18. The device of claim 11, wherein the GPU is configured to:
   timeline segment the animation timeline into a plurality of timeline segments, wherein the plurality of timeline segments form the animation timeline,
   wherein to determine the plurality of bounding polygons, the GPU is configured to determine the plurality of bounding polygons based on the plurality of timeline segments.

19. The device of claim 11, wherein the one or more primitives includes a cluster of a plurality of primitives.

20. The device of claim 11, wherein to execute one or more instances of the pixel shader to process the second set of samples of the bounding polygon, the GPU is configured to execute one or more instances of the pixel shader to add motion blur to the second frame as part of stochastic rasterization.

21. A non-transitory computer-readable storage medium having instructions stored thereon that when executed cause one or more processors of a device for graphics processing to:
   determine a plurality of bounding polygons that together cover an animation timeline of one or more primitives from a first frame to a second frame, wherein each bounding polygon covers a portion of the animation timeline, and wherein the animation timeline corresponds to a movement of the one or more primitives;
   determine temporal values for samples within each of the bounding polygons based on a sampling pattern;
   prior to samples of respective bounding polygons being processed by a pixel shader of a graphics pipeline of a graphics processing unit (GPU), determine which samples within respective bounding polygons are to be further processed based on temporal values for the samples within respective bounding polygons and respective different threshold conditions for each of the respective bounding polygons;
   discard from further processing a first set of the samples within a bounding polygon of the plurality of bounding polygons and maintain a second set of the samples within the bounding polygon of the plurality of bounding polygons based on the determination, from a threshold condition for that bounding polygon, of which samples within the bounding polygon are to be further processed; and
   execute one or more instances of the pixel shader to process the second set of samples of the bounding polygon.

22. A device for graphics processing, the device comprising:
   means for determining a plurality of bounding polygons that together cover an animation timeline of one or more primitives from a first frame to a second frame, wherein each bounding polygon covers a portion of the animation timeline, and wherein the animation timeline corresponds to a movement of the one or more primitives;
   means for determining temporal values for samples within each of the bounding polygons based on a sampling pattern;
   means for determining which samples within respective bounding polygons are to be further processed based on temporal values for the samples within respective bounding polygons and respective different threshold conditions for each of the respective bounding polygons, prior to samples of respective bounding polygons being processed by a pixel shader of a graphics pipeline of a graphics processing unit (GPU);

means for discarding from further processing a first set of the samples within a bounding polygon of the plurality of bounding polygons and means for maintaining a second set of the samples within the bounding polygon of the plurality of bounding polygons based on the determination, from a threshold condition for that bounding polygon, of which samples within the bounding polygon are to be further processed; and means for executing one or more instances of the pixel shader to process the second set of samples of the bounding polygon.

\* \* \* \* \*